US011611501B2

(12) United States Patent
Xu et al.

(10) Patent No.: US 11,611,501 B2
(45) Date of Patent: Mar. 21, 2023

(54) APPARATUS, METHOD, AND COMPUTER PROGRAM

(71) Applicant: NOKIA TECHNOLOGIES OY, Espoo (FI)

(72) Inventors: Xiang Xu, Jiangsu (CN); Esa Malkamäki, Espoo (FI); Matti Laitila, Oulu (FI); Thomas Höhne, Helsinki (FI); Henri Markus Koskinen, Espoo (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 15/733,510

(22) PCT Filed: Aug. 16, 2019

(86) PCT No.: PCT/CN2019/101173
§ 371 (c)(1),
(2) Date: Aug. 14, 2020

(87) PCT Pub. No.: WO2021/031000
PCT Pub. Date: Feb. 25, 2021

(65) Prior Publication Data
US 2022/0166703 A1 May 26, 2022

(51) Int. Cl.
*H04L 45/58* (2022.01)
*H04L 45/02* (2022.01)
*H04L 61/50* (2022.01)

(52) U.S. Cl.
CPC .............. *H04L 45/02* (2013.01); *H04L 61/50* (2022.05)

(58) Field of Classification Search
CPC ....... H04L 45/302; H04L 45/48; H04L 45/02; H04L 61/20; H04W 36/0011;
(Continued)

(56) References Cited

U.S. PATENT DOCUMENTS 10,374,866 B1 8/2019 Berg et al.
10,708,968 B2 * 7/2020 Kim ...................... H04W 76/30
(Continued)

FOREIGN PATENT DOCUMENTS

CN          1909713 A      2/2007

OTHER PUBLICATIONS

3GPP TS 38.401, Technical Specification 3rd Generation Partnership Project; Technical Specification Group Radio Access Network; (Release 15) V15.2.0, 39 pages, Jun. 6, 2018.*
(Continued)

*Primary Examiner* — Frank Duong
(74) *Attorney, Agent, or Firm* — Brake Hughes Bellermann LLP

(57) ABSTRACT

An apparatus comprising: at least one processor; and at least one memory including computer program code; the at least one memory and the computer program code configured to, with the at least one processor, cause the apparatus at least to: receive (1400) a request to create context for a migrating node and optionally at least one child node of the migrating node; allocate (1402) addresses to the migrating node and optionally the at least one child node of the migrating node; and send (1404) the addresses allocated to the migrating node and optionally the at least one child node of the migrating node, prior to the migrating node migrating from a source to a target.

20 Claims, 18 Drawing Sheets

(58) Field of Classification Search
CPC ..... H04W 36/08; H04W 36/14; H04W 36/18; H04W 36/24; H04W 36/30; H04W 40/12; H04W 40/22; H04W 76/11; H04W 76/12; H04W 80/04
See application file for complete search history.

(56) References Cited

U.S. PATENT DOCUMENTS

| | | | |
|---|---|---|---|
| 2005/0198384 A1 | 9/2005 | Ansari et al. | |
| 2009/0135738 A1 | 5/2009 | Mhatre et al. | |
| 2018/0279182 A1* | 9/2018 | Sang | H04W 36/0055 |
| 2020/0045610 A1* | 2/2020 | Shih | H04W 40/248 |
| 2020/0120572 A1* | 4/2020 | Fiorani | H04W 36/06 |
| 2020/0120725 A1* | 4/2020 | Mildh | H04W 76/12 |
| 2020/0221329 A1* | 7/2020 | Kim | H04W 72/0426 |
| 2020/0245223 A1* | 7/2020 | Cheng | H04L 45/745 |
| 2020/0351930 A1* | 11/2020 | Luo | H04W 72/0446 |
| 2021/0227435 A1* | 7/2021 | Hsieh | H04W 36/0055 |
| 2021/0250817 A1* | 8/2021 | Zou | H04W 48/16 |
| 2021/0315030 A1* | 10/2021 | Teyeb | H04L 12/4633 |
| 2022/0015176 A1* | 1/2022 | Ishii | H04W 76/15 |

OTHER PUBLICATIONS

3GPP TR 38.874, 3rd Generation Partnership Project; Technical Specification Group Radio Access Network; NR; Study on Integrated Access and Backhaul; (Release 16) V16.0.0, 111 pages, Dec. 2018.*

Qualcomm Incorporated, Ericsson, Nokia, Huawei, KDDI, IAB topology adaptation for architecture 1a, 3GPP TSG-RAN WG3 Meeting #101, R3-184693, 13 pages, Aug. 24, 2028.*

Nokia, Nokia Shanghai Bell, Qualcomm Incorporated, Huawei, Ericsson, Topology Adaptation Scenarios, 3GPP TSG-RAN WG3 #101, R3-184896, 6 pages, Aug. 24, 2018.*

International Search Report and Written Opinion for International Application No. PCT/CN2019/101173, dated May 18, 2020, 8 pages.

* cited by examiner

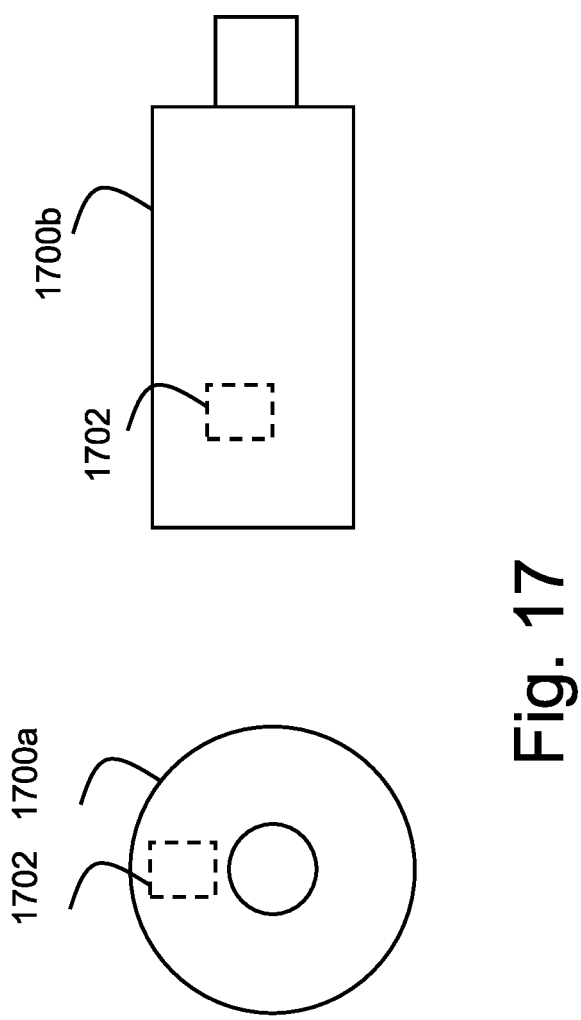

APPARATUS, METHOD, AND COMPUTER PROGRAM

CROSS-REFERENCE TO RELATED APPLICATIONS

This application is a national stage entry of International Application No. PCT/CN2019/101173, filed Aug. 16, 2019, entitled "APPARATUS, METHOD, AND COMPUTER PROGRAM" which is hereby incorporated by reference in its entirety.

FIELD OF THE DISCLOSURE

The present disclosure relates to an apparatus, a method, and a computer program for performing topology adaptation/mobility in a cellular network.

BACKGROUND

A communication system can be seen as a facility that enables communication sessions between two or more entities such as user terminals, base stations/access points and/or other nodes by providing carriers between the various entities involved in the communications path. A communication system can be provided for example by means of a communication network and one or more compatible communication devices. The communication sessions may comprise, for example, communication of data for carrying communications such as voice, electronic mail (email), text message, multimedia and/or content data and so on. Non-limiting examples of services provided comprise two-way or multi-way calls, data communication or multimedia services and access to a data network system, such as the Internet. In a wireless communication system at least a part of a communication session between at least two stations occurs over a wireless link.

A user can access the communication system by means of an appropriate communication device or terminal. A communication device of a user is often referred to as user equipment (UE) or user device. A communication device is provided with an appropriate signal receiving and transmitting apparatus for enabling communications, for example enabling access to a communication network or communications directly with other users. The communication device may access a carrier provided by a station or access point, and transmit and/or receive communications on the carrier.

The communication system and associated devices typically operate in accordance with a required standard or specification which sets out what the various entities associated with the system are permitted to do and how that should be achieved.

Communication protocols and/or parameters which shall be used for the connection are also typically defined. One example of a communications system is 2G system (2GS) using global system for mobile communications (GSM) radio access technology, 3G system (3GS) using universal mobile telecommunications system (UMTS) radio access technology, 4G system (4GS) using long-term evolution-advanced (LTE-A) radio access technology or 5G system (5GS) using new radio (NR) radio access technology.

SUMMARY

According to an aspect there is provided an apparatus comprising at least one processor and at least one memory including computer code for one or more programs, the at least one memory and the computer code configured, with the at least one processor, to cause the apparatus at least to: receive a request to create context for a migrating node and optionally at least one child node of the migrating node; allocate addresses to the migrating node and optionally the at least one child node of the migrating node; and send the addresses allocated to the migrating node and optionally the at least one child node of the migrating node, prior to the migrating node migrating from a source to a target.

The source may be a source donor distributed unit or an integrated access and backhaul node connected via a source donor distributed unit.

The target may be a target donor distributed unit or an integrated access and backhaul node connected via a target donor distributed unit.

The at least one memory and the computer program code may be configured to, with the at least one processor, cause the apparatus at least to: receive, from a donor centralized unit control plane, the request to create context for the migrating node and optionally the at least one child node of the migrating node.

The at least one memory and the computer program code may be configured to, with the at least one processor, cause the apparatus at least to: send, to a donor centralized unit control plane, the addresses allocated to the migrating node and optionally the at least one child node of the migrating node.

The at least one memory and the computer program code may be configured to, with the at least one processor, cause the apparatus at least to: receive, from a donor centralized unit control plane, a request to configure a routing table for downlink traffic to the migrating node and optionally the at least one child node of the migrating node; and configure the routing table based on the addresses allocated to the migrating node and optionally the at least one child node of the migrating node.

Configuring the routing table for downlink traffic to the migrating node and optionally the at least one child node of the migrating node based on the addresses to the migrating node and optionally the at least one child node of the migrating node may comprise: mapping the addresses allocated to the migrating node and optionally the at least one child node of the migrating node with respective downlink backhaul adaptation protocol identifiers, wherein the downlink backhaul adaptation protocol identifiers comprise a backhaul adaptation protocol identifier of the migrating node and optionally backhaul adaptation protocol identifiers of the at least one child node of the migrating node; and activating the configured routing table subsequent to the migrating node migrating from the source to the target.

The apparatus may be a target donor distributed unit.

According to an aspect there is provided an apparatus comprising circuitry configured to: receive a request to create context for a migrating node and optionally at least one child node of the migrating node; allocate addresses to the migrating node and optionally the at least one child node of the migrating node; and send the addresses allocated to the migrating node and optionally the at least one child node of the migrating node, prior to the migrating node migrating from a source to a target.

The source may be a source donor distributed unit or an integrated access and backhaul node connected via a source donor distributed unit.

The target may be a target donor distributed unit or an integrated access and backhaul node connected via a target donor distributed unit.

The apparatus may comprise circuitry configured to: receive, from a donor centralized unit control plane, the request to create context for the migrating node and optionally the at least one child node of the migrating node.

The apparatus may comprise circuitry configured to: send, to a donor centralized unit control plane, the addresses allocated to the migrating node and optionally the at least one child node of the migrating node.

The apparatus may comprise circuitry configured to: receive, from a donor centralized unit control plane, a request to configure a routing table for downlink traffic to the migrating node and optionally the at least one child node of the migrating node; and configure the routing table based on the addresses allocated to the migrating node and optionally the at least one child node of the migrating node.

Configuring the routing table for downlink traffic to the migrating node and optionally the at least one child node of the migrating node based on the addresses to the migrating node and optionally the at least one child node of the migrating node may comprise: mapping the addresses allocated to the migrating node and optionally the at least one child node of the migrating node with respective downlink backhaul adaptation protocol identifiers, wherein the downlink backhaul adaptation protocol identifiers comprise a backhaul adaptation protocol identifier of the migrating node and optionally backhaul adaptation protocol identifiers of the at least one child node of the migrating node; and activating the configured routing table subsequent to the migrating node migrating from the source to the target.

The apparatus may be a target donor distributed unit.

According to an aspect there is provided an apparatus comprising means for: receiving a request to create context for a migrating node and optionally at least one child node of the migrating node; allocating addresses to the migrating node and optionally the at least one child node of the migrating node; and sending the addresses allocated to the migrating node and optionally the at least one child node of the migrating node, prior to the migrating node migrating from a source to a target.

The source may be a source donor distributed unit or an integrated access and backhaul node connected via a source donor distributed unit.

The target may be a target donor distributed unit or an integrated access and backhaul node connected via a target donor distributed unit.

The apparatus may comprise means for: receiving, from a donor centralized unit control plane, the request to create context for the migrating node and optionally the at least one child node of the migrating node.

The apparatus may comprise means for: sending, to a donor centralized unit control plane, the addresses allocated to the migrating node and optionally the at least one child node of the migrating node.

The apparatus may comprise means for: receiving, from a donor centralized unit control plane, a request to configure a routing table for downlink traffic to the migrating node and optionally the at least one child node of the migrating node; and configuring the routing table based on the addresses allocated to the migrating node and optionally the at least one child node of the migrating node.

Configuring the routing table for downlink traffic to the migrating node and optionally the at least one child node of the migrating node based on the addresses to the migrating node and optionally the at least one child node of the migrating node may comprise: mapping the addresses allocated to the migrating node and optionally the at least one child node of the migrating node with respective downlink backhaul adaptation protocol identifiers, wherein the downlink backhaul adaptation protocol identifiers comprise a backhaul adaptation protocol identifier of the migrating node and optionally backhaul adaptation protocol identifiers of the at least one child node of the migrating node; and activating the configured routing table subsequent to the migrating node migrating from the source to the target.

The apparatus may be a target donor distributed unit.

According to an aspect there is provided a method comprising: receiving a request to create context for a migrating node and optionally at least one child node of the migrating node; allocating addresses to the migrating node and optionally the at least one child node of the migrating node; and sending the addresses allocated to the migrating node and optionally the at least one child node of the migrating node, prior to the migrating node migrating from a source to a target.

The source may be a source donor distributed unit or an integrated access and backhaul node connected via a source donor distributed unit.

The target may be a target donor distributed unit or an integrated access and backhaul node connected via a target donor distributed unit.

The method may comprise: receiving, from a donor centralized unit control plane, the request to create context for the migrating node and optionally the at least one child node of the migrating node.

The method may comprise: sending, to a donor centralized unit control plane, the addresses allocated to the migrating node and optionally the at least one child node of the migrating node.

The method may comprise: receiving, from a donor centralized unit control plane, a request to configure a routing table for downlink traffic to the migrating node and optionally the at least one child node of the migrating node; and configuring the routing table based on the addresses allocated to the migrating node and optionally the at least one child node of the migrating node.

Configuring the routing table for downlink traffic to the migrating node and optionally the at least one child node of the migrating node based on the addresses to the migrating node and optionally the at least one child node of the migrating node may comprise: mapping the addresses allocated to the migrating node and optionally the at least one child node of the migrating node with respective downlink backhaul adaptation protocol identifiers, wherein the downlink backhaul adaptation protocol identifiers comprise a backhaul adaptation protocol identifier of the migrating node and optionally backhaul adaptation protocol identifiers of the at least one child node of the migrating node; and activating the configured routing table subsequent to the migrating node migrating from the source to the target.

The method may be performed by a target donor distributed unit.

According to an aspect there is provided a computer program comprising computer executable code which when run on at least one processor is configured to: receive a request to create context for a migrating node and optionally at least one child node of the migrating node; allocate addresses to the migrating node and optionally the at least one child node of the migrating node; and send the addresses allocated to the migrating node and optionally the at least one child node of the migrating node, prior to the migrating node migrating from a source to a target.

The source may be a source donor distributed unit or an integrated access and backhaul node connected via a source donor distributed unit.

The target may be a target donor distributed unit or an integrated access and backhaul node connected via a target donor distributed unit.

The computer program may comprise computer executable code which when run on at least one processor is configured to: receive, from a donor centralized unit control plane, the request to create context for the migrating node and optionally the at least one child node of the migrating node.

The computer program may comprise computer executable code which when run on at least one processor is configured to: send, to a donor centralized unit control plane, the addresses allocated to the migrating node and optionally the at least one child node of the migrating node.

The computer program may comprise computer executable code which when run on at least one processor is configured to: receive, from a donor centralized unit control plane, a request to configure a routing table for downlink traffic to the migrating node and optionally the at least one child node of the migrating node; and configure the routing table based on the addresses allocated to the migrating node and optionally the at least one child node of the migrating node.

Configuring the routing table for downlink traffic to the migrating node and optionally the at least one child node of the migrating node based on the addresses to the migrating node and optionally the at least one child node of the migrating node may comprise: mapping the addresses allocated to the migrating node and optionally the at least one child node of the migrating node with respective downlink backhaul adaptation protocol identifiers, wherein the downlink backhaul adaptation protocol identifiers comprise a backhaul adaptation protocol identifier of the migrating node and optionally backhaul adaptation protocol identifiers of the at least one child node of the migrating node; and activating the configured routing table subsequent to the migrating node migrating from the source to the target.

The at least one processor may be part of a target donor distributed unit.

According to an aspect there is provided an apparatus comprising at least one processor and at least one memory including computer code for one or more programs, the at least one memory and the computer code configured, with the at least one processor, to cause the apparatus at least to: determine that a migrating node is about to migrate from a source to a target and in response to the determining, send a request to create context for the migrating node and optionally at least one child node of the migrating node.

The source may be a source donor distributed unit or an integrated access and backhaul node connected via a source donor distributed unit.

The target may be a target donor distributed unit or an integrated access and backhaul node connected via a target donor distributed unit.

The at least one memory and the computer program code may be configured to, with the at least one processor, cause the apparatus at least to: send the request, to a target donor distributed unit, to create context for the migrating node and optionally the at least one child node of the migrating node.

The at least one memory and the computer program code may be configured to, with the at least one processor, cause the apparatus at least to: receive, from the target donor distributed unit, the addresses allocated to the migrating node and optionally the at least one child node of the migrating node.

The at least one memory and the computer program code may be configured to, with the at least one processor, cause the apparatus at least to: send, to the migrating node and optionally the at least one child node of the migrating node, the addresses allocated to the migrating node and optionally the at least one child node of the migrating node.

The at least one memory and the computer program code may be configured to, with the at least one processor, cause the apparatus at least to: send, to the migrating node and optionally the at least one child node of the migrating node, an uplink backhaul adaptation protocol identifier.

The uplink backhaul adaptation protocol identifier may comprise a backhaul adaptation protocol identifier of a target donor distributed unit or a backhaul adaptation protocol identifier of a target donor centralized unit.

The at least one memory and the computer program code may be configured to, with the at least one processor, cause the apparatus at least to: send, to a distributed unit, a request to configure a routing table for downlink traffic to the migrating node and optionally the at least one child node of the migrating node.

The distributed unit may be a target donor distributed unit or a distributed unit in an integrated access and backhaul node.

The at least one memory and the computer program code may be configured to, with the at least one processor, cause the apparatus at least to: send, to a donor centralized unit user plane, a request to replace addresses associated with fully qualified tunnel endpoint identifiers for terminals connected to the migrating node or optionally the at least one child node of the migrating node with the addresses allocated to the migrating node or optionally the at least one child node of the migrating node.

The apparatus may be a donor centralized unit control plane.

According to an aspect there is provided an apparatus comprising circuitry configured to: determine that a migrating node is about to migrate from a source to a target; and in response to the determining, send a request to create context for the migrating node and optionally at least one child node of the migrating node.

The source may be a source donor distributed unit or an integrated access and backhaul node connected via a source donor distributed unit.

The target may be a target donor distributed unit or an integrated access and backhaul node connected via a target donor distributed unit.

The apparatus may comprise circuitry configured to: send the request, to a target donor distributed unit, to allocate addresses to the migrating node and optionally the at least one child node of the migrating node.

The apparatus may comprise circuitry configured to: receive, from the target donor distributed unit, the addresses allocated to the migrating node and optionally the at least one child node of the migrating node.

The apparatus may comprise circuitry configured to: send, to the migrating node and optionally the at least one child node of the migrating node, the addresses allocated to the migrating node and optionally the at least one child node of the migrating node.

The apparatus may comprise circuitry configured to: send, to the migrating node and optionally the at least one child node of the migrating node, an uplink backhaul adaptation protocol identifier.

The uplink backhaul adaptation protocol identifier may comprise a backhaul adaptation protocol identifier of a target donor distributed unit or a backhaul adaptation protocol identifier of a target donor centralized unit.

The apparatus may comprise circuitry configured to: send, to a distributed unit, a request to configure a routing table for downlink traffic to the migrating node and optionally the at least one child node of the migrating node.

The distributed unit may be a target donor distributed unit or a distributed unit in an integrated access and backhaul node.

The apparatus may comprise circuitry configured to: send, to a donor centralized unit user plane, a request to replace addresses associated with fully qualified tunnel endpoint identifiers for terminals connected to the migrating node or optionally the at least one child node of the migrating node with the addresses allocated to the migrating node or optionally the at least one child node of the migrating node.

The apparatus may be a donor centralized unit control plane.

According to an aspect there is provided an apparatus comprising means for:

determining that a migrating node is about to migrate from a source to a target; and in response to the determining, sending a request to create context for the migrating node and optionally at least one child node of the migrating node.

The source may be a source donor distributed unit or an integrated access and backhaul node connected via a source donor distributed unit.

The target may be a target donor distributed unit or an integrated access and backhaul node connected via a target donor distributed unit.

The apparatus may comprise means for: sending the request, to a target donor distributed unit, to create context for the migrating node and optionally the at least one child node of the migrating node.

The apparatus may comprise means for: receiving, from the target donor distributed unit, the addresses allocated to the migrating node and optionally the at least one child node of the migrating node.

The apparatus may comprise means for: sending, to the migrating node and optionally the at least one child node of the migrating node, the addresses allocated to the migrating node and optionally the at least one child node of the migrating node.

The apparatus may comprise means for: sending, to the migrating node and optionally the at least one child node of the migrating node, an uplink backhaul adaptation protocol identifier.

The uplink backhaul adaptation protocol identifier may comprise a backhaul adaptation protocol identifier of a target donor distributed unit or a backhaul adaptation protocol identifier of a target donor centralized unit.

The apparatus may comprise means for: sending, to a distributed unit, a request to configure a routing table for downlink traffic to the migrating node and optionally the at least one child node of the migrating node.

The distributed unit may be a target donor distributed unit or a distributed unit in an integrated access and backhaul node.

The apparatus may comprise means for: sending, to a donor centralized unit user plane, a request to replace addresses associated with fully qualified tunnel endpoint identifiers for terminals connected to the migrating node or optionally the at least one child node of the migrating node with the addresses allocated to the migrating node or optionally the at least one child node of the migrating node.

The apparatus may be a donor centralized unit control plane.

According to an aspect there is provided a method comprising: determining that a migrating node is about to migrate from a source to a target; and in response to the determining, sending a request to create context for the migrating node and optionally at least one child node of the migrating node.

The source may be a source donor distributed unit or an integrated access and backhaul node connected via source donor distributed unit.

The target may be a target donor distributed unit or an integrated access and backhaul node connected via target donor distributed unit.

The method may comprise: sending the request, to a target donor distributed unit, to create context for the migrating node and optionally the at least one child node of the migrating node.

The method may comprise: receiving, from the target donor distributed unit, the addresses allocated to the migrating node and optionally the at least one child node of the migrating node.

The method may comprise: sending, to the migrating node and optionally the at least one child node of the migrating node, the addresses allocated to the migrating node and optionally the at least one child node of the migrating node.

The method may comprise: sending, to the migrating node and optionally the at least one child node of the migrating node, an uplink backhaul adaptation protocol identifier.

The uplink backhaul adaptation protocol identifier may comprise a backhaul adaptation protocol identifier of a target donor distributed unit or a backhaul adaptation protocol identifier of a target donor centralized unit.

The method may comprise: sending, to a distributed unit, a request to configure a routing table for downlink traffic to the migrating node and optionally the at least one child node of the migrating node.

The distributed unit may be a target donor distributed unit or a distributed unit in an integrated access and backhaul node.

The method may comprise: sending, to a donor centralized unit user plane, a request to replace addresses associated with fully qualified tunnel endpoint identifiers for terminals connected to the migrating node or optionally the at least one child node of the migrating node with the addresses allocated to the migrating node or optionally the at least one child node of the migrating node.

The method may be performed by a donor centralized unit control plane.

According to an aspect there is provided a computer program comprising computer executable code which when run on at least one processor is configured to: determine that a migrating node is about to migrate from a source to a target; and in response to the determining, send a request to create context for the migrating node and optionally at least one child node of the migrating node.

The source may be a source donor distributed unit or an integrated access and backhaul node connected via a source donor distributed unit.

The target may be a target donor distributed unit or an integrated access and backhaul node connected via a target donor distributed unit.

The computer program may comprise computer executable code which when run on at least one processor is configured to: send the request, to a target donor distributed unit, to create context for the migrating node and optionally the at least one child node of the migrating node.

The computer program may comprise computer executable code which when run on at least one processor is configured to: receive, from the target donor distributed unit, the addresses allocated to the migrating node and optionally the at least one child node of the migrating node.

The computer program may comprise computer executable code which when run on at least one processor is configured to: send, to the migrating node and optionally the at least one child node of the migrating node, the addresses allocated to the migrating node and optionally the at least one child node of the migrating node.

The computer program may comprise computer executable code which when run on at least one processor is configured to: send, to the migrating node and optionally the at least one child node of the migrating node, an uplink backhaul adaptation protocol identifier.

The uplink backhaul adaptation protocol identifier may comprise a backhaul adaptation protocol identifier of a target donor distributed unit or a backhaul adaptation protocol identifier of a target donor centralized unit.

The computer program may comprise computer executable code which when run on at least one processor is configured to: send, to a distributed unit, a request to configure a routing table for downlink traffic to the migrating node and optionally the at least one child node of the migrating node.

The distributed unit may be a target donor distributed unit or a distributed unit in an integrated access and backhaul node.

The computer program may comprise computer executable code which when run on at least one processor is configured to: send, to a donor centralized unit user plane, a request to replace addresses associated with fully qualified tunnel endpoint identifiers for terminals connected to the migrating node or optionally the at least one child node of the migrating node with the addresses allocated to the migrating node or optionally the at least one child node of the migrating node.

The at least one processor may be part of donor centralized unit control plane.

According to an aspect there is provided an apparatus comprising at least one processor and at least one memory including computer code for one or more programs, the at least one memory and the computer code configured, with the at least one processor, to cause the apparatus at least to: receive addresses allocated to a migrating node and optionally at least one child node of the migrating node, prior to the migrating node migrating from a source to a target; and send the addresses allocated to the migrating node and optionally the at least one child node of the migrating node.

The source may be a source donor distributed unit or an integrated access and backhaul node connected via a source donor distributed unit.

The target may be a target donor distributed unit or an integrated access and backhaul node connected via a target donor distributed unit.

The at least one memory and the computer program code may be configured to, with the at least one processor, cause the apparatus at least to: receive, from a donor centralized unit control plane, the addresses allocated to the migrating node and optionally the at least one child node of the migrating node; and send, to the migrating node and optionally the at least one child node of the migrating node, the addresses allocated the migrating node and optionally the at least one child node of the migrating node.

The at least one memory and the computer program code may be configured to, with the at least one processor, cause the apparatus at least to: receive, from the donor centralized unit control plane, an uplink backhaul adaptation protocol identifier; and send, to the migrating node and the at least one child node of the migrating node, the uplink backhaul adaptation protocol identifier.

The apparatus may be the source.

According to an aspect there is provided an apparatus comprising circuitry configured to: receive addresses allocated to a migrating node and optionally at least one child node of the migrating node, prior to the migrating node migrating from a source to a target; and send the addresses allocated to the migrating node and optionally the at least one child node of the migrating node.

The source may be a source donor distributed unit or an integrated access and backhaul node connected via a source donor distributed unit.

The target may be a target donor distributed unit or an integrated access and backhaul node connected via a target donor distributed unit.

The apparatus may comprise circuitry configured to: receive, from a donor centralized unit control plane, the addresses allocated to the migrating node and optionally the at least one child node of the migrating node; and send, to the migrating node and optionally the at least one child node of the migrating node, the addresses allocated to the migrating node and optionally the at least one child node of the migrating node.

The apparatus may comprise circuitry configured to: receive, from the donor centralized unit control plane, an uplink backhaul adaptation protocol identifier; and send, to the migrating node and the at least one child node of the migrating node, the uplink backhaul adaptation protocol identifier.

The apparatus may be the source.

According to an aspect there is provided an apparatus comprising means for: receiving addresses allocated to a migrating node and optionally at least one child node of the migrating node, prior to the migrating node migrating from a source to a target; and sending the addresses allocated to the migrating node and optionally the at least one child node of the migrating node.

The source may be a source donor distributed unit or an integrated access and backhaul node connected via a source donor distributed unit.

The target may be a target donor distributed unit or an integrated access and backhaul node connected via a target donor distributed unit.

The apparatus may comprise means for: receiving, from a donor centralized unit control plane, the addresses allocated to the migrating node and optionally the at least one child node of the migrating node; and sending, to the migrating node and optionally the at least one child node of the migrating node, the addresses allocated to the migrating node and optionally the at least one child node of the migrating node.

The apparatus may comprise means for: receiving, from the donor centralized unit control plane, an uplink backhaul adaptation protocol identifier; and sending, to the migrating node and the at least one child node of the migrating node, the uplink backhaul adaptation protocol identifier.

The apparatus may be the source.

According to an aspect there is provided a method comprising: receiving addresses allocated to a migrating node and optionally at least one child node of the migrating node, prior to the migrating node migrating from a source to a target; and sending the addresses allocated to the migrating node and optionally the at least one child node of the migrating node.

The source may be a source donor distributed unit or an integrated access and backhaul node connected via a source donor distributed unit.

The target may be a target donor distributed unit or an integrated access and backhaul node connected via a target donor distributed unit.

The method may comprise: receiving, from a donor centralized unit control plane, the addresses allocated to the migrating node and optionally the at least one child node of the migrating node; and sending, to the migrating node and optionally the at least one child node of the migrating node, the addresses allocated to the migrating node and optionally the at least one child node of the migrating node.

The method may comprise: receiving, from the donor centralized unit control plane, an uplink backhaul adaptation protocol identifier; and sending, to the migrating node and the at least one child node of the migrating node, the uplink backhaul adaptation protocol identifier.

The method may be performed by the source.

According to an aspect there is provided a computer program comprising computer executable code which when run on at least one processor is configured to: receive addresses allocated to a migrating node and optionally at least one child node of the migrating node, prior to the migrating node migrating from a source to a target; and send the addresses allocated to the migrating node and optionally the at least one child node of the migrating node.

The source may be a source donor distributed unit or an integrated access and backhaul node connected via a source donor distributed unit.

The target may be a target donor distributed unit or an integrated access and backhaul node connected via a target donor distributed unit.

The computer program may comprise computer executable code which when run on at least one processor is configured to: receive, from a donor centralized unit control plane, the addresses allocated to the migrating node and optionally the at least one child node of the migrating node; and send, to the migrating node and optionally the at least one child node of the migrating node, the addresses allocated to the migrating node and optionally the at least one child node of the migrating node.

The computer program may comprise computer executable code which when run on at least one processor is configured to: receive, from the donor centralized unit control plane, an uplink backhaul adaptation protocol identifier; and send, to the migrating node and the at least one child node of the migrating node, the uplink backhaul adaptation protocol identifier.

The at least one processor may be part of the source.

According to an aspect there is provided an apparatus comprising at least one processor and at least one memory including computer code for one or more programs, the at least one memory and the computer code configured, with the at least one processor, to cause the apparatus at least to: receive at least one of a new address, a new backhaul adaptation protocol identifier and a new uplink fully qualified tunnel endpoint identifier, prior to a migrating node migrating from a source to a target; and receive an indication that topology adaptation is completed; and use the at least one of the new address, the new backhaul adaptation protocol identifier, and the new uplink fully qualified tunnel endpoint identifier, subsequent to the migrating node migrating from the source to the target.

The source may be a source donor distributed unit or an integrated access and backhaul node connected via a source donor distributed unit.

The target may be a target donor distributed unit or an integrated access and backhaul node connected via a target donor distributed unit.

The at least one memory and the computer program code may be configured to, with the at least one processor, cause the apparatus at least to: receive configuration to configure a routing table for downlink traffic.

Using the at least one of the new address, the new backhaul adaptation protocol identifier and the new uplink fully qualified tunnel endpoint identifier comprises at least one of: indicating the new allocated address as a source address in a packet sent; indicating the new backhaul adaptation protocol identifier as a target backhaul adaptation protocol identifier in a packet sent; indicating the new fully qualified tunnel endpoint identifier in a packet sent over F1-U interface; and replacing an existing backhaul adaptation protocol identifier with the new backhaul adaptation protocol identifier in a header of a buffered uplink packet.

According to an aspect there is provided an apparatus comprising circuitry configured to: receive at least one of a new address, a new backhaul adaptation protocol identifier and a new uplink fully qualified tunnel endpoint identifier, prior to a migrating node migrating from a source to a target; and receive an indication that topology adaptation is completed; and use the at least one of the new address, the new backhaul adaptation protocol identifier, and the new uplink fully qualified tunnel endpoint identifier, subsequent to the migrating node migrating from the source to the target.

The source may be a source donor distributed unit or an integrated access and backhaul node connected via a source donor distributed unit.

The target may be a target donor distributed unit or an integrated access and backhaul node connected via a target donor distributed unit.

The apparatus may comprise circuitry configured to, with the at least one processor, cause the apparatus at least to: receive configuration to configure a routing table for downlink traffic.

Using the at least one of the new address, the new backhaul adaptation protocol identifier and the new uplink fully qualified tunnel endpoint identifier comprises at least one of: indicating the new allocated address as a source address in a packet sent; indicating the new backhaul adaptation protocol identifier as a target backhaul adaptation protocol identifier in a packet sent; indicating the new fully qualified tunnel endpoint identifier in a packet sent over F1-U interface; and replacing an existing backhaul adaptation protocol identifier with the new backhaul adaptation protocol identifier in a header of a buffered uplink packet.

The apparatus may be an integrated access and backhaul node.

According to an aspect there is provided an apparatus comprising means for: receiving at least one of a new address, a new backhaul adaptation protocol identifier and a new uplink fully qualified tunnel endpoint identifier, prior to a migrating node migrating from a source to a target; and receiving an indication that topology adaptation is completed; and use the at least one of the new address, the new backhaul adaptation protocol identifier, and the new uplink fully qualified tunnel endpoint identifier, subsequent to the migrating node migrating from the source to the target.

The source may be a source donor distributed unit or an integrated access and backhaul node connected via a source donor distributed unit.

The target may be a target donor distributed unit or an integrated access and backhaul node connected via a target donor distributed unit.

The apparatus may comprise means for: receiving configuration to configure a routing table for downlink traffic.

Using the at least one of the new address, the new backhaul adaptation protocol identifier and the new uplink fully qualified tunnel endpoint identifier comprises at least one of: indicating the new allocated address as a source address in a packet sent; indicating the new backhaul adaptation protocol identifier as a target backhaul adaptation protocol identifier in a packet sent; indicating the new fully qualified tunnel endpoint identifier in a packet sent over F1-U interface; and replacing an existing backhaul adaptation protocol identifier with the new backhaul adaptation protocol identifier in a header of a buffered uplink packet.

The apparatus may be an integrated access and backhaul node.

According to an aspect there is provided a method comprising: receiving at least one of a new address, a new backhaul adaptation protocol identifier and a new uplink fully qualified tunnel endpoint identifier, prior to a migrating node migrating from a source to a target; and receiving an indication that topology adaptation is completed; and use the at least one of the new address, the new backhaul adaptation protocol identifier, and the new uplink fully qualified tunnel endpoint identifier, subsequent to the migrating node migrating from the source to the target.

The source may be a source donor distributed unit or an integrated access and backhaul node connected via a source donor distributed unit.

The target may be a target donor distributed unit or an integrated access and backhaul node connected via a target donor distributed unit.

The method may comprise: receiving configuration to configure a routing table for downlink traffic.

Using the at least one of the new address, the new backhaul adaptation protocol identifier and the new uplink fully qualified tunnel endpoint identifier comprises at least one of: indicating the new allocated address as a source address in a packet sent;

indicating the new backhaul adaptation protocol identifier as a target backhaul adaptation protocol identifier in a packet sent; indicating the new fully qualified tunnel endpoint identifier in a packet sent over F1-U interface; and replacing an existing backhaul adaptation protocol identifier with the new backhaul adaptation protocol identifier in a header of a buffered uplink packet.

The method may be performed by an integrated access and backhaul node.

According to an aspect there is provided a computer program comprising computer executable code which when run on at least one processor is configured to: receive at least one of a new address, a new backhaul adaptation protocol identifier and a new uplink fully qualified tunnel endpoint identifier, prior to a migrating node migrating from a source to a target; and receive an indication that topology adaptation is completed; and use the at least one of the new address, the new backhaul adaptation protocol identifier, and the new uplink fully qualified tunnel endpoint identifier, subsequent to the migrating node migrating from the source to the target.

The source may be a source donor distributed unit or an integrated access and backhaul node connected via a source donor distributed unit.

The target may be a target donor distributed unit or an integrated access and backhaul node connected via a target donor distributed unit.

The computer program may comprise computer executable code which when run on at least one processor is configured to: receive configuration to configure a routing table for downlink traffic.

Using the at least one of the new address, the new backhaul adaptation protocol identifier and the new uplink fully qualified tunnel endpoint identifier comprises at least one of: indicating the new allocated address as a source address in a packet sent; indicating the new backhaul adaptation protocol identifier as a target backhaul adaptation protocol identifier in a packet sent; indicating the new fully qualified tunnel endpoint identifier in a packet sent over F1-U interface; and replacing an existing backhaul adaptation protocol identifier with the new backhaul adaptation protocol identifier in a header of a buffered uplink packet.

The at least one processor may be part of an integrated access and backhaul node.

According to an aspect, there is provided a computer readable medium comprising program instructions stored thereon for performing at least one of the above methods.

According to an aspect, there is provided a non-transitory computer readable medium comprising program instructions stored thereon for performing at least one of the above methods.

According to an aspect, there is provided a non-volatile tangible memory medium comprising program instructions stored thereon for performing at least one of the above methods.

In the above, many different aspects have been described. It should be appreciated that further aspects may be provided by the combination of any two or more of the aspects described above.

Various other aspects are also described in the following detailed description and in the attached claims.

List of Abbreviations

Adapt: Adaptation
AF: Application Function
AMF: Access Management Function
AP: Application Protocol
AUSF: Authentication Server Function
BAP: Backhaul Adaptation Protocol
BH: BackHaul
CP: Control Plane
CU: Centralized Unit
DHCP: Dynamic Host Configuration Protocol
DL: Downlink
DN: Data Network
DRB: Data Radio Bearer
DTLS: Datagram Transport Layer Security
DU: Distributed Unit
E-UTRAN: Evolved Universal Terrestrial Radio Access Network
F1-U F1 User plane interface
F1-C F1 Control plane interface
HAP F1 Application Protocol
F-TEID: Fully qualified Tunnel Endpoint Identifier
gNB: gNodeB
GPRS: General Packet Radio Service
GSM: Global System for Mobile communication
GTP-U: GPRS Tunnel Protocol User data
IAB: Integrated Access and Backhaul
ID: Identifier
IoT: Internet of Things
IP: Internet Protocol
LTE: Long Term Evolution NEF: Network Exposure Function
NR: New Radio
MAC: Medium Access Control
MS: Mobile Station
MT: Mobile Terminal
PDA: Personal Digital Assistant
PDCP: Packet Data Convergence Protocol
RAM: Random Access Memory
RAN: Radio Access Network
RLC: Radio Link Control
ROM: Read Only Memory
RRC: Radio Resource Control
SCTP: Stream Control Transmission Protocol
SDAP: Service Data Adaptation protocol
SI: Study Item
SMF: Session Management Function
SRB: Signalling Radio Bearer
TEID: Tunnel Endpoint Identifier
UE: User Equipment
UDP: User Datagram Protocol
UL: Uplink
UMTS: Universal Mobile Telecommunication System
UP: User Plane
USB: Universal Serial Bus
WI: Working Item
3G: $3^{rd}$ Generation
3GPP: $3^{rd}$ Generation Partnership Project
4G: 4th Generation
5G: 5th Generation
5GC: 5G Core network
5GRAN: 5G Radio Access Network
5GS: 5G System

BRIEF DESCRIPTION OF THE FIGURES

Embodiments will now be described, by way of example only, with reference to the accompanying Figures in which:

FIG. 17 shows a schematic representation of a non-volatile memory medium storing instructions which when executed by a processor allow a processor to perform one or more of the steps of the above methods.

DETAILED DESCRIPTION OF THE FIGURES

In the following certain embodiments are explained with reference to mobile communication devices capable of communication via a wireless cellular system and mobile communication systems serving such mobile communication devices. Before explaining in detail the exemplifying embodiments, certain general principles of a wireless communication system, access systems thereof, and mobile communication devices are briefly explained with reference to FIGS. 1, 2 and 3 to assist in understanding the technology underlying the described examples.

Figure 1:
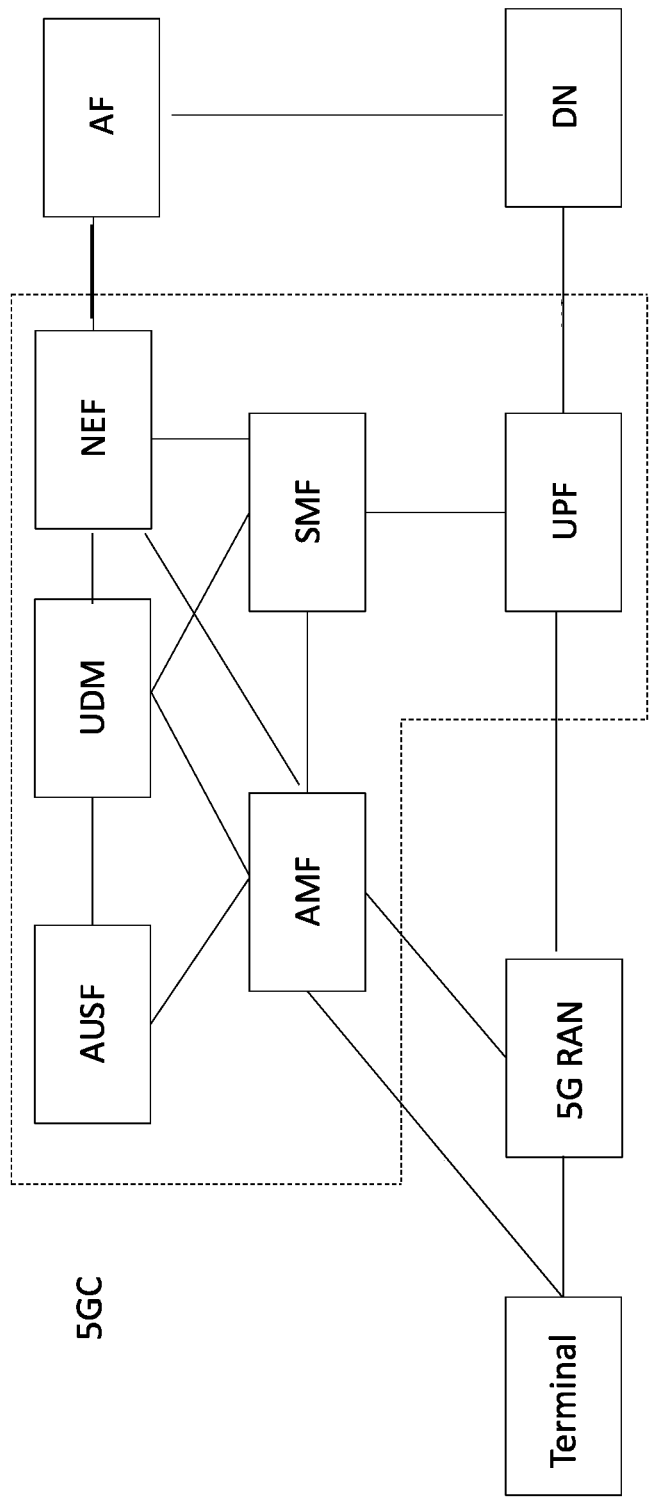
FIG. 1 shows a schematic representation of a 5G system (5GS)

FIG. 1 shows a schematic representation of a 5G system (5GS). The 5GS may comprises a terminal, a 5G radio access network (5G RAN), a 5G core network (5GC), one or more application function (AF) and one or more data networks (DN).

The 5G RAN may comprise one or more gNodeB (gNB) distributed unit (DU) functions connected to one or more gNodeB (gNB) centralized unit (CU) functions.

The 5G RAN may comprise one or more integrated access and backhaul node (IAB) node. Each IAB node may comprise one or more DU functions and one or more terminal functions.

The 5GC may comprise an access and mobility management function (AMF), a session management function (SMF), an authentication server function (AUSF), a user data management (UDM), a user plane function (UPF) and/or a network exposure function (NEF).

Figure 2:
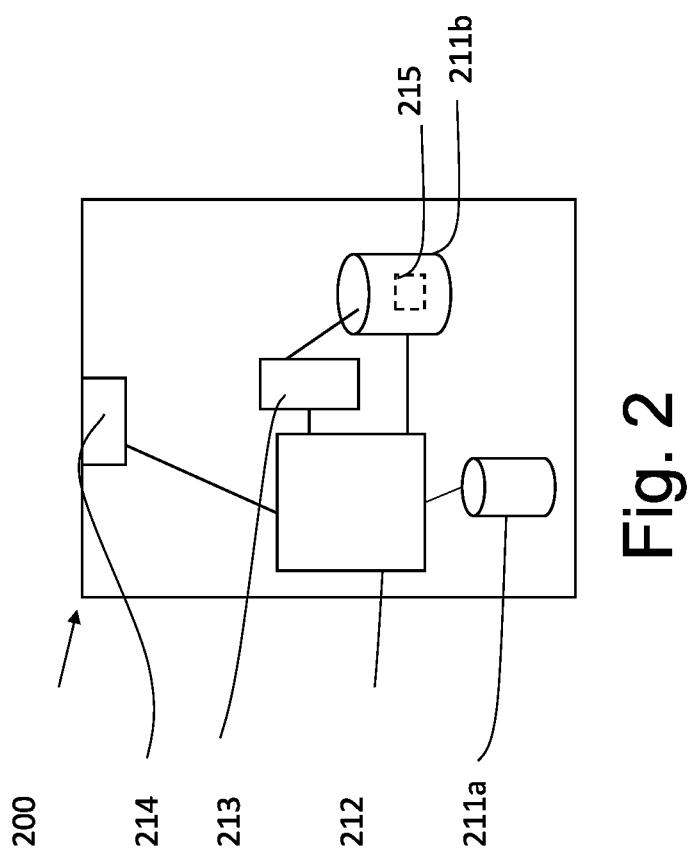
FIG. 2 shows a schematic representation of a control apparatus.

FIG. 2 illustrates an example of a control apparatus 200 for controlling a function of the 5G RAN or 5GC as illustrated on FIG. 1, for example a DU function of an IAB node or a terminal function of an IAB node. The control apparatus may comprise at least one random access memory (RAM) 211*a*, at least on read only memory (ROM) 211*b*, at least one processor 212, 213 and an input/output interface 214. The at least one processor 212, 213 may be coupled to the RAM 211*a* and the ROM 211*b*. The at least one processor 212, 213 may be configured to execute an appropriate software code 215. The software code 215 may for example allow to perform one or more steps to perform one or more of the present aspects. The software code 215 may be stored in the ROM 211*b*. The control apparatus 200 may be interconnected with another control apparatus 200 controlling another function the 5G RAN or 5GC. In some embodiments, each function of the 5G RAN or 5GC comprises a control apparatus 200.

Figure 3:
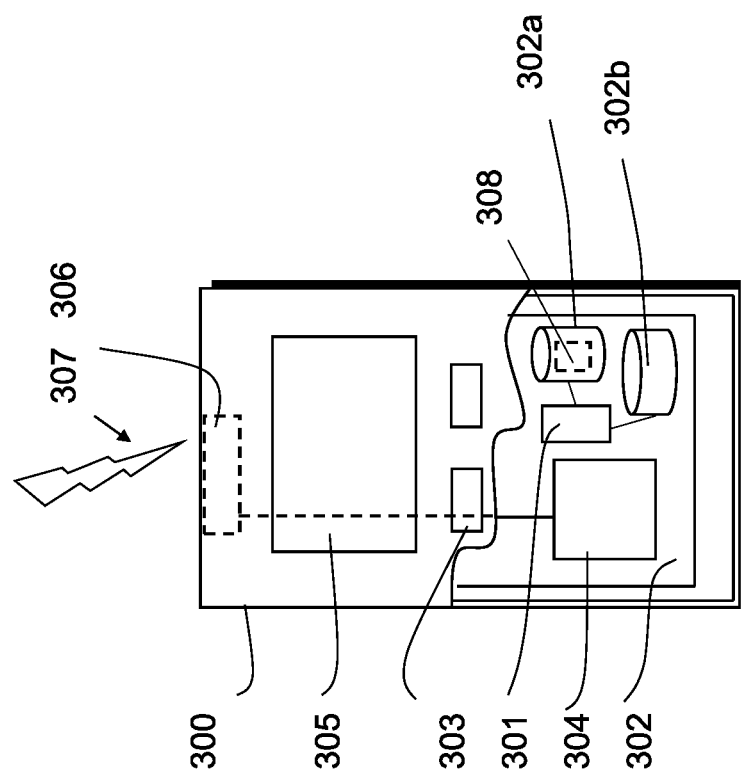
FIG. 3 shows a schematic representation of a terminal.

FIG. 3 illustrates an example of a terminal 300, such as the terminal illustrated on FIG. 1. The terminal 300 may be provided by any device capable of sending and receiving radio signals. Non-limiting examples comprise a user equipment, a mobile station (MS) or mobile device such as a mobile phone or what is known as a 'smart phone', a computer provided with a wireless interface card or other wireless interface facility (e.g., USB dongle), a personal data assistant (PDA) or a tablet provided with wireless communication capabilities, a machine-type communications (MTC) device, an Internet of things (IoT) type communication device or any combinations of these or the like. The terminal 300 may provide, for example, communication of data for carrying communications. The communications may be one or more of voice, electronic mail (email), text message, multimedia, data, machine data and so on.

The terminal 300 may receive signals over an air or radio interface 307 via appropriate apparatus for receiving and may transmit signals via appropriate apparatus for transmitting radio signals. In FIG. 3 transceiver apparatus is designated schematically by block 306. The transceiver apparatus 306 may be provided for example by means of a radio part and associated antenna arrangement. The antenna arrangement may be arranged internally or externally to the mobile device.

The terminal 300 may be provided with at least one processor 301, at least one memory ROM 302*a*, at least one RAM 302*b* and other possible components 303 for use in software and hardware aided execution of tasks it is designed to perform, including control of access to and communications with access systems and other communication devices. The at least one processor 301 is coupled to the RAM 211*a* and the ROM 211*b*. The at least one processor 301 may be configured to execute an appropriate software code 308. The software code 308 may for example allow to perform one or more of the present aspects. The software code 308 may be stored in the ROM 211*b*.

The processor, storage and other relevant control apparatus can be provided on an appropriate circuit board and/or in chipsets. This feature is denoted by reference 304. The device may optionally have a user interface such as key pad 305, touch sensitive screen or pad, combinations thereof or the like. Optionally one or more of a display, a speaker and a microphone may be provided depending on the type of the device.

Although one or more of the preceding and following aspects relate to 5GS, it will be understood that similar aspects may relate to other systems.

One or more of the following aspects relate to new radio (NR) integrated access and backhaul (IAB). 3GPP has been working on NR IAB working item (WI) based on study item (SI) outcome (3GPP TR 38.874). A layer 2 (L2) based architecture option has been selected for the normative phase.

Figure 4:
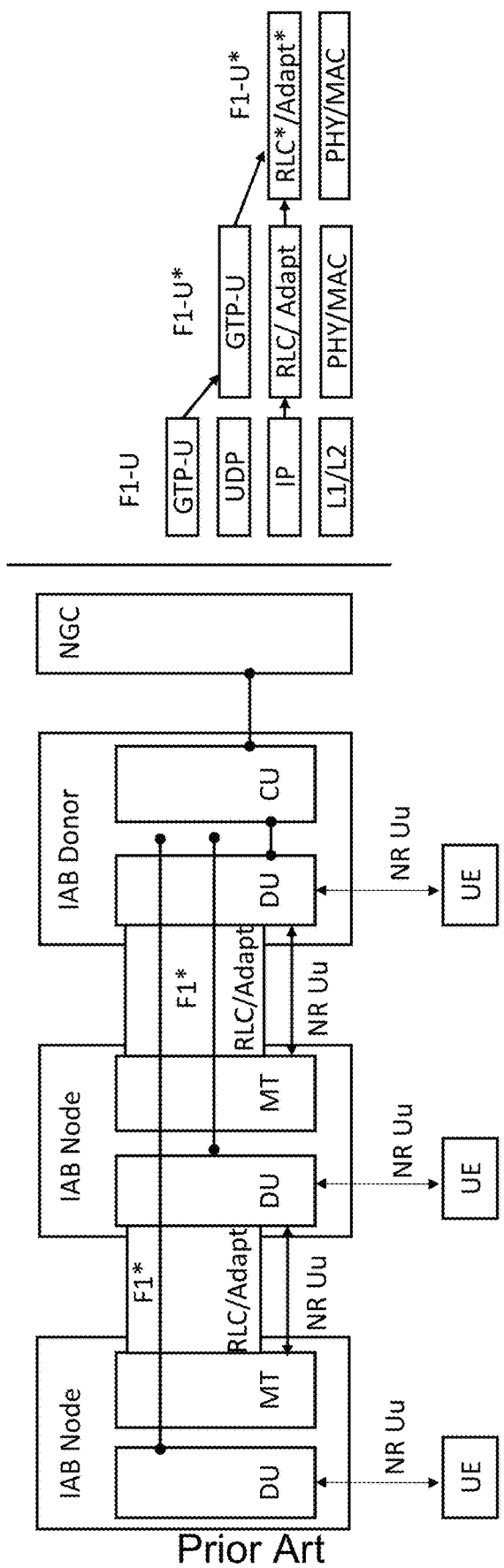
FIG. 4 shows a schematic representation of an integrated access and backhaul architecture.
Figure 6:
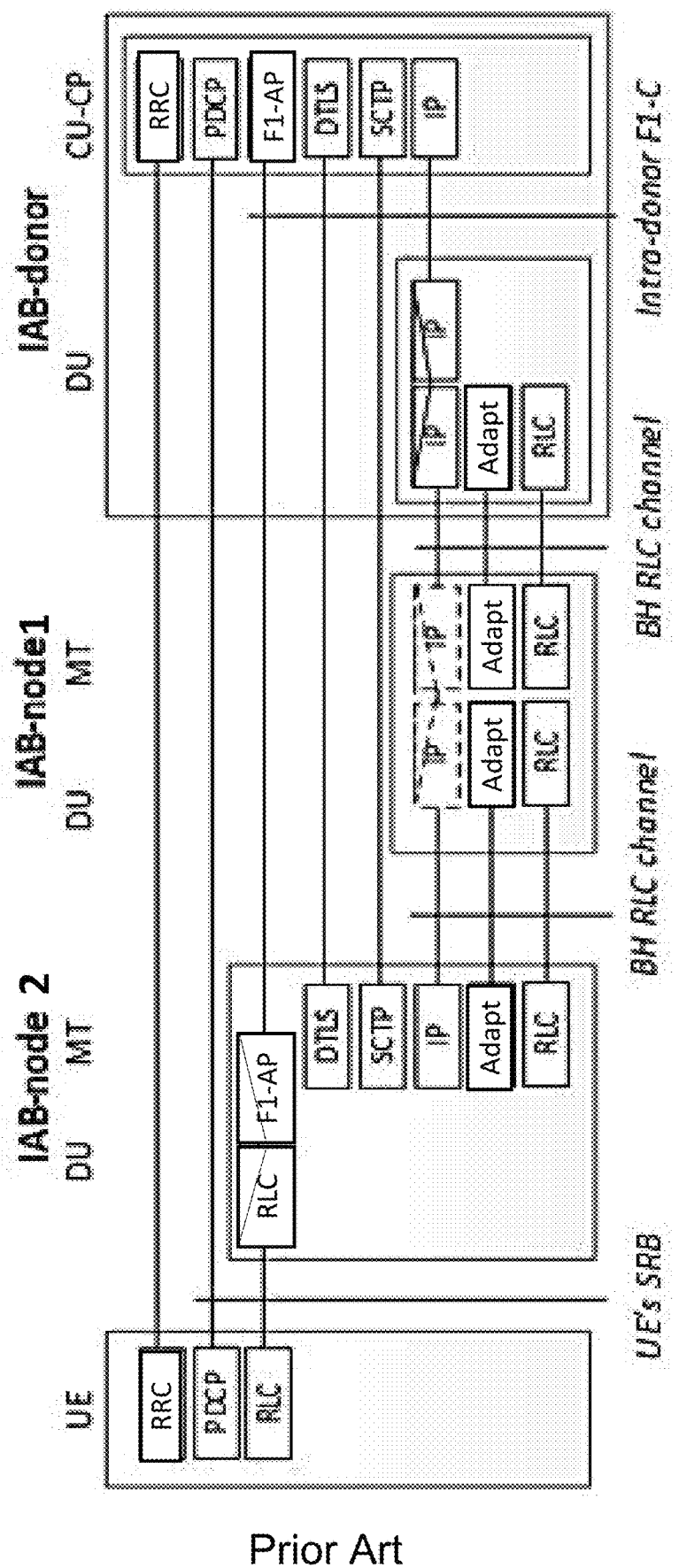
FIG. 6 shows a schematic representation of a protocol stack for radio resource control of a user equipment.

FIG. 4 shows a schematic representation of an integrated access and backhaul architecture 1*a* as per 3GPP TR 38.874 (see FIG. 6.3.1-1).

Figure 5:
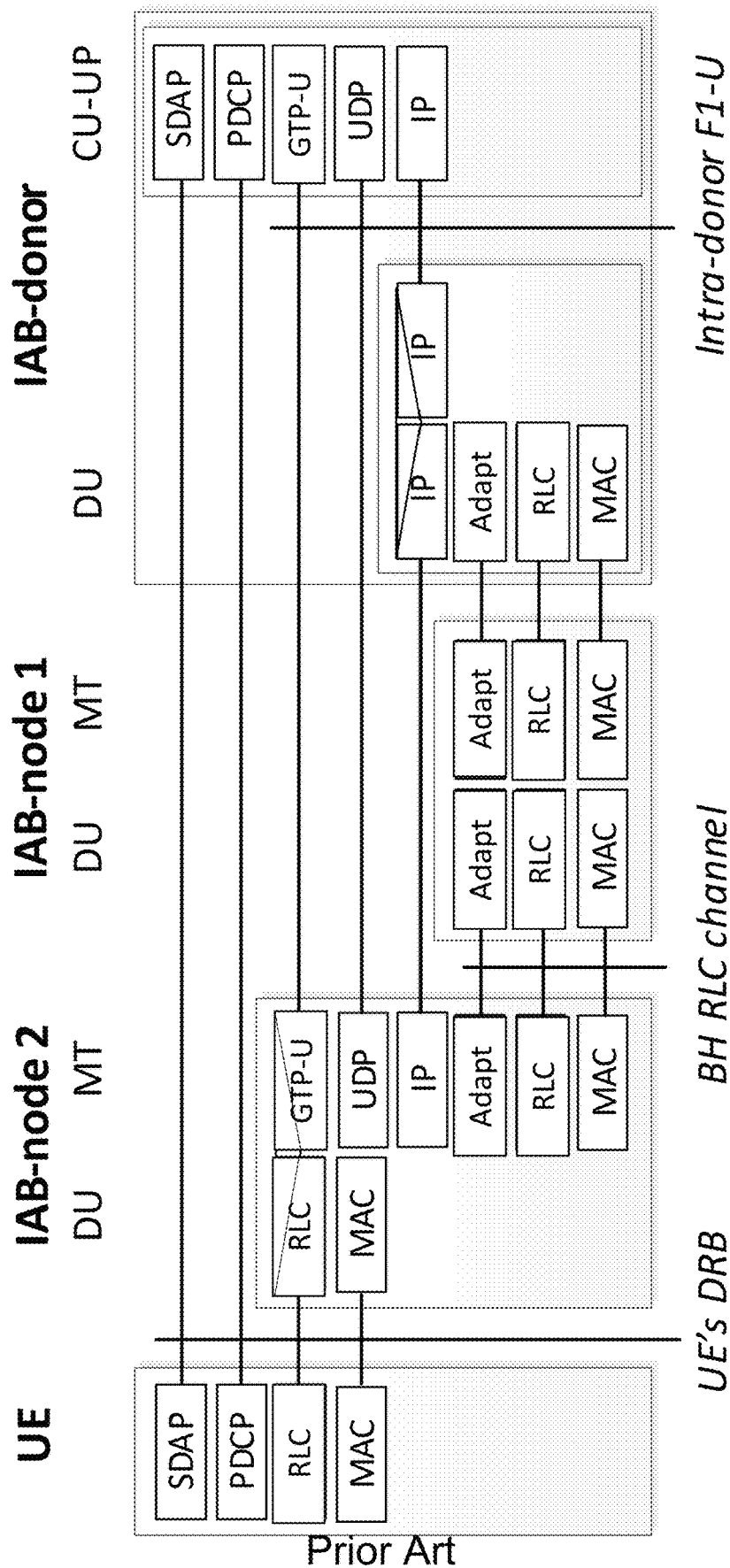
FIG. 5 shows a schematic representation of a protocol stack example for user equipment access using layer 2 relaying with adaptation layer.
Figure 8:
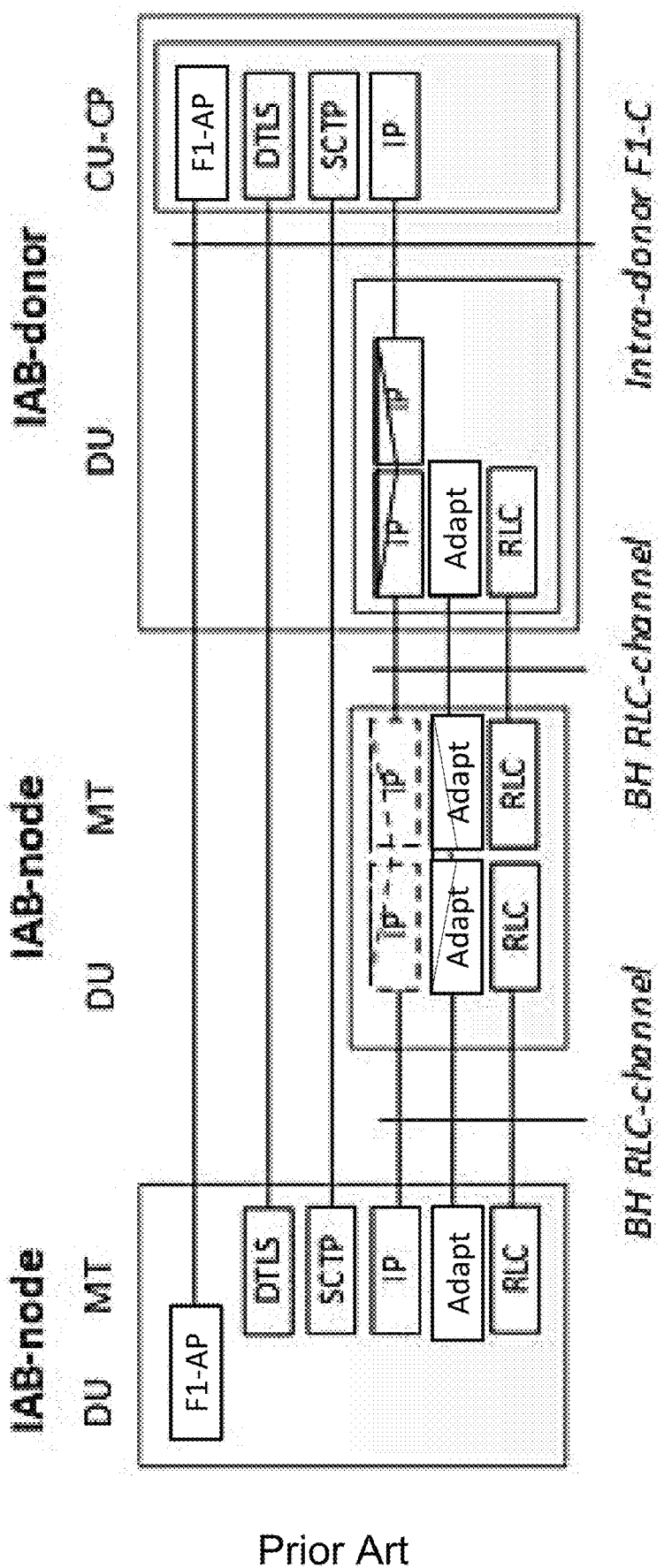
FIG. 8 shows a schematic representation of a protocol stack for F1 application protocol of a distributed unit part of an integrated access and backhaul node.

FIG. 5 shows a schematic representation of a protocol stack example for user equipment access using layer 2 relaying with adaptation layer as per 3GPP TR 38.874 (see FIG. 8.2.1-1.*e*).

FIG. 6 shows a schematic representation of a protocol stack for radio resource control of a user equipment as per 3GPP TR 38.874 (see FIG. 8.3.5-4.*a*).

Figure 7:
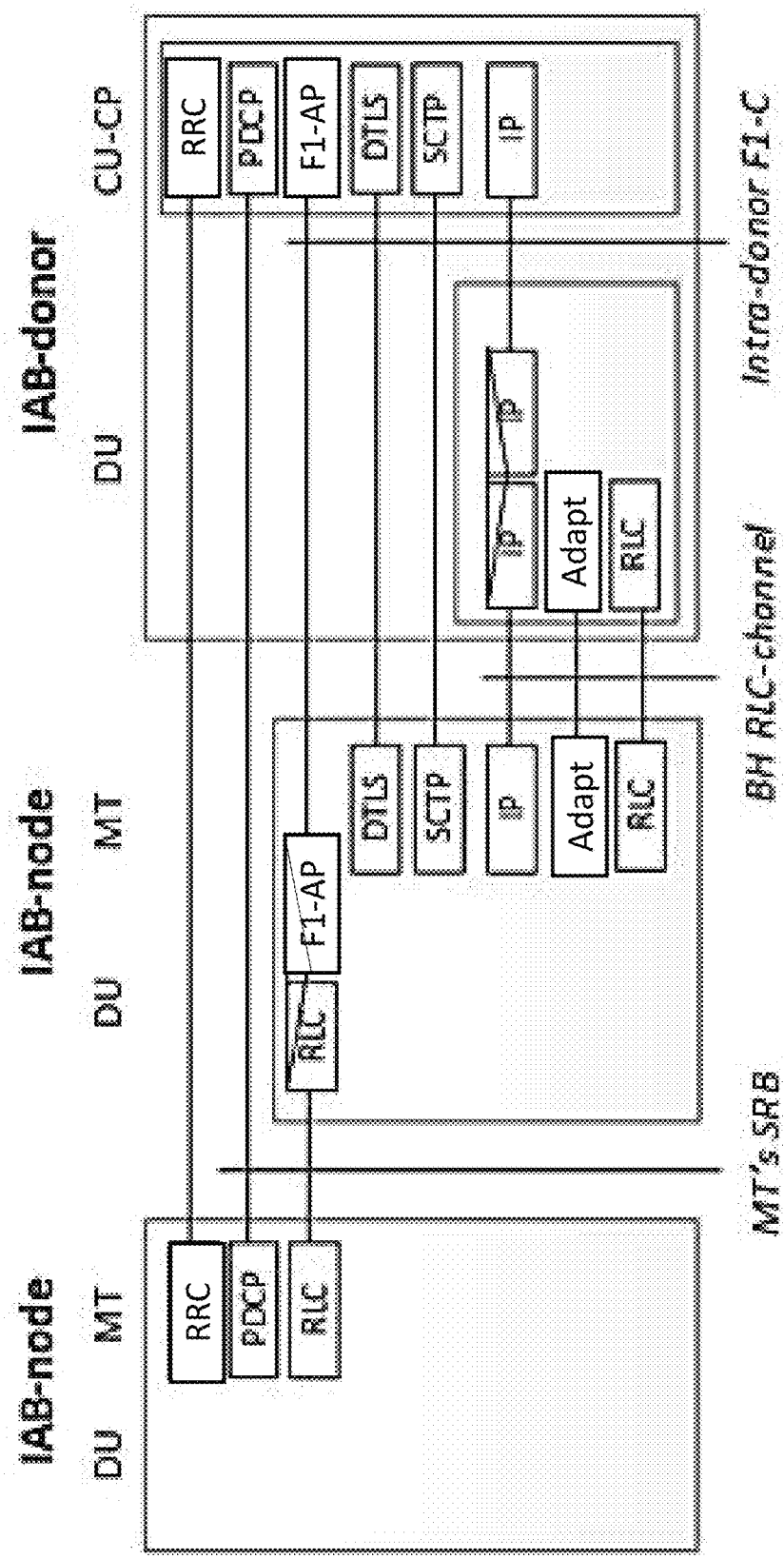
FIG. 7 shows a schematic representation of a protocol stack for radio resource control of a mobile terminal part of an integrated access and backhaul node.

FIG. 7 shows a schematic representation of a protocol stack for radio resource control of a mobile terminal part of an integrated access and backhaul node as per 3GPP TR 38.874 (see FIG. 8.3.5-4.*b*).

FIG. 8 shows a schematic representation of a protocol stack for F1 application protocol of a distributed unit part of an integrated access and backhaul node as per 3GPP TR 38.874 (see FIG. 8.3.5-4.*c*).

One or more of the following aspects relate to multiple-hop backhauling. Multi-hop backhauling may provide greater range extension than single hop backhauling. This may be especially beneficial for backhaul at frequencies above-6 GHz due to limited range. Multi-hop backhauling may further enable backhauling around obstacles (e.g. buildings and other clutter in urban environments) where line-of-sight between IAB nodes is obstructed. An IAB node may change its parent nodes, which is referred as topology adaptation or mobility. Changing parent node may occur for a station IAB node or a mobile IAB node.

Figure 9B:
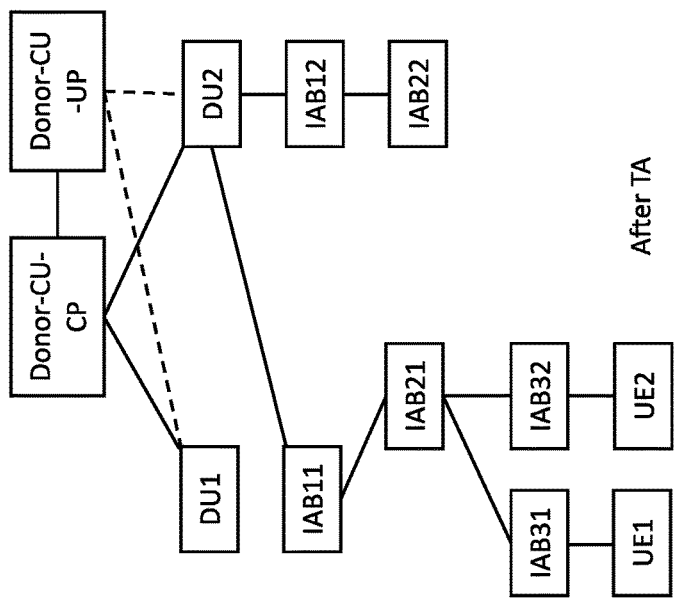
FIGS. 9*a* and 9*b* show schematic representations of an integrated access and backhaul node topology before and after topology adaptation.
Figure 9A:
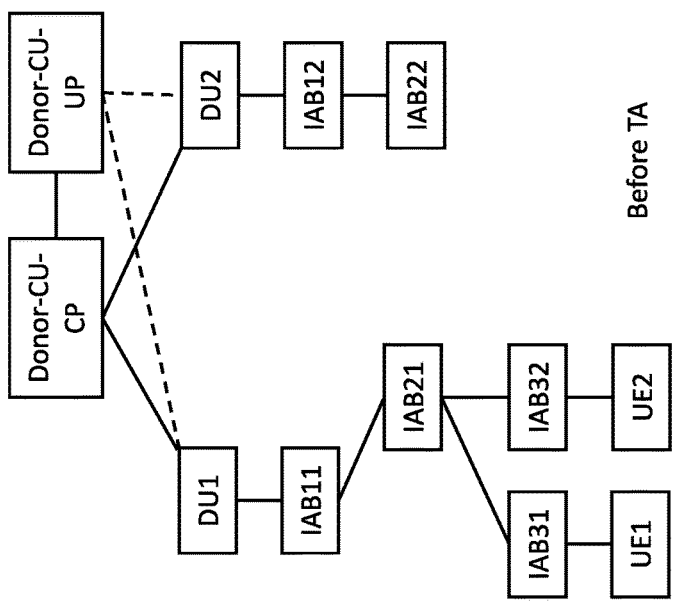

FIG. 9*a* shows schematic representations of an IAB topology before and after topology adaptation. The IAB topology may comprise an IAB donor centralized unit control plane (CU-CP), an IAB donor centralized unit user plane (CU-UP), IAB donor distributed units (DU1, DU2), IAB nodes (IAB11, IAB21, IAB31, IAB32, IAB12, IAB22) and user equipment (UE1, UE2).

DU1 is connected to CU-UP and CU-CP. IAB11 is connected to DU1. IAB21 is connected to IAB11. IAB31 is connected to IAB21. IAB32 is connected to IAB21. UE1 is connected to IAB31. UE2 is connected to IAB32. IAB21 is a child node of IAB11. IAB31 and IAB32 are child IAB nodes of IAB21. IAB31 and IAB32 are further child IAB nodes of IAB11. For simplicity, IAB21, IAB31 and IAB32 are all referred as child IAB nodes of IAB11. IAB11 is the parent IAB node of IAB21. IAB21 is the parent node of IAB31 and IAB32.

DU2 is connected to CU-UP and CU-CP. IAB12 is connected to DU2. IAB22 is connected to IAB12. IAB22 is the child IAB node of IAB12. IAB12 is the parent IAB node of IAB22.

In an inter DU/intra CU mobility scenario IAB11 may migrate from DU1 to DU2, where both DU1 and DU2 are connected to the same CU-UP, and same or different CU-CP. In an intra DU/intra CU mobility scenario IAB21 may migrate from IAB11 to IAB14, where both IAB11 and IAB14 are connected to the same Donor-DU (not illustrated).

In an inter DU/inter CU mobility scenario IAB11 may migrate from DU1 to DU3, where DU1 and DU3 are connected to different CU-UPs and CU-CPs (not illustrated).

It may be assumed that topology adaptation is initiated by the CU based on measurements reported by a migrating IAB node MT part and or by other IAB nodes MT parts. The measurements may be based on a measurement configuration the migrating IAB node or the other IAB nodes received from the CU.

Figure 10:
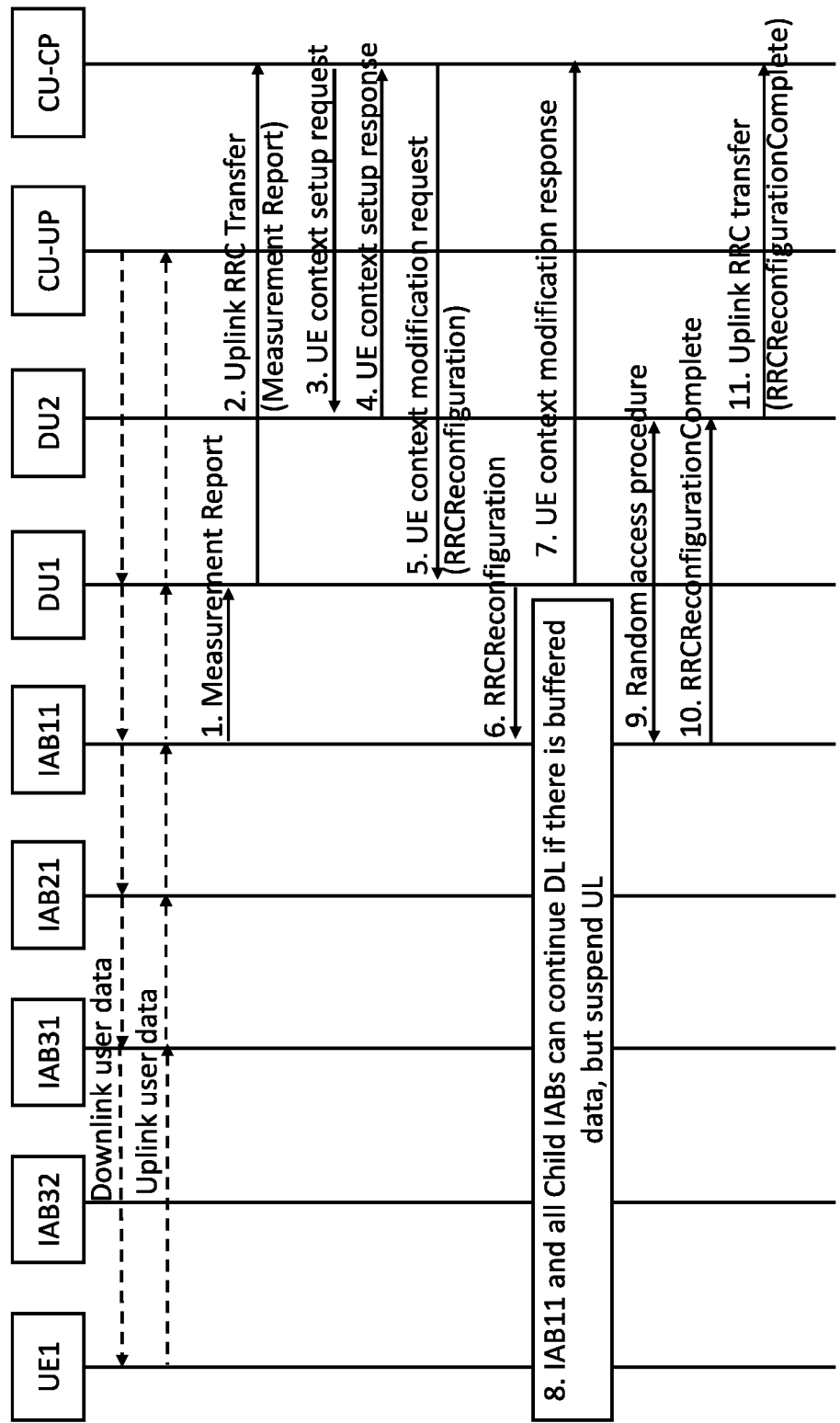
FIGS. 10, 11 and 12 show a schematic representation of a signalling diagram of a method of performing topology adaptation/mobility.
Figure 11:
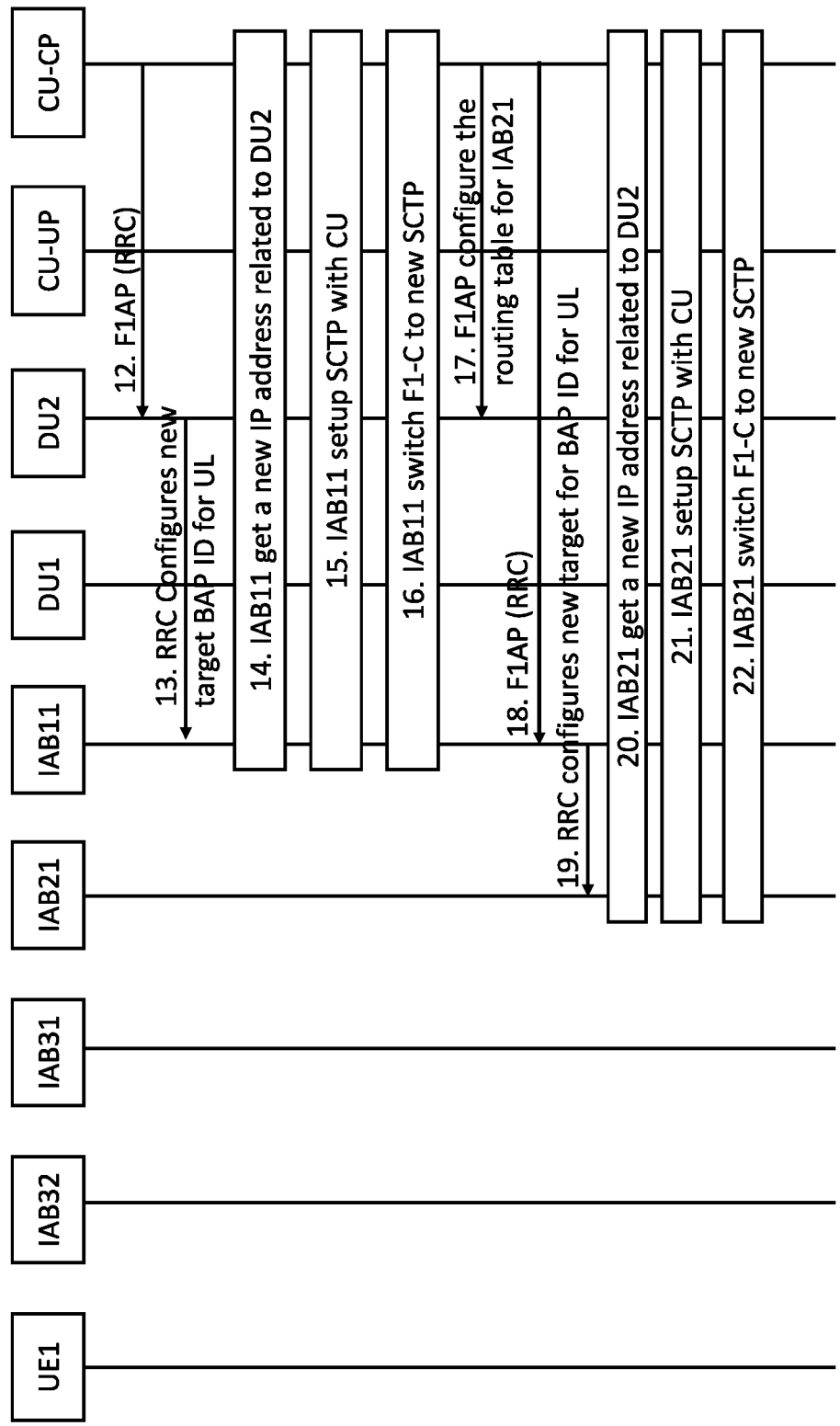
Figure 12:
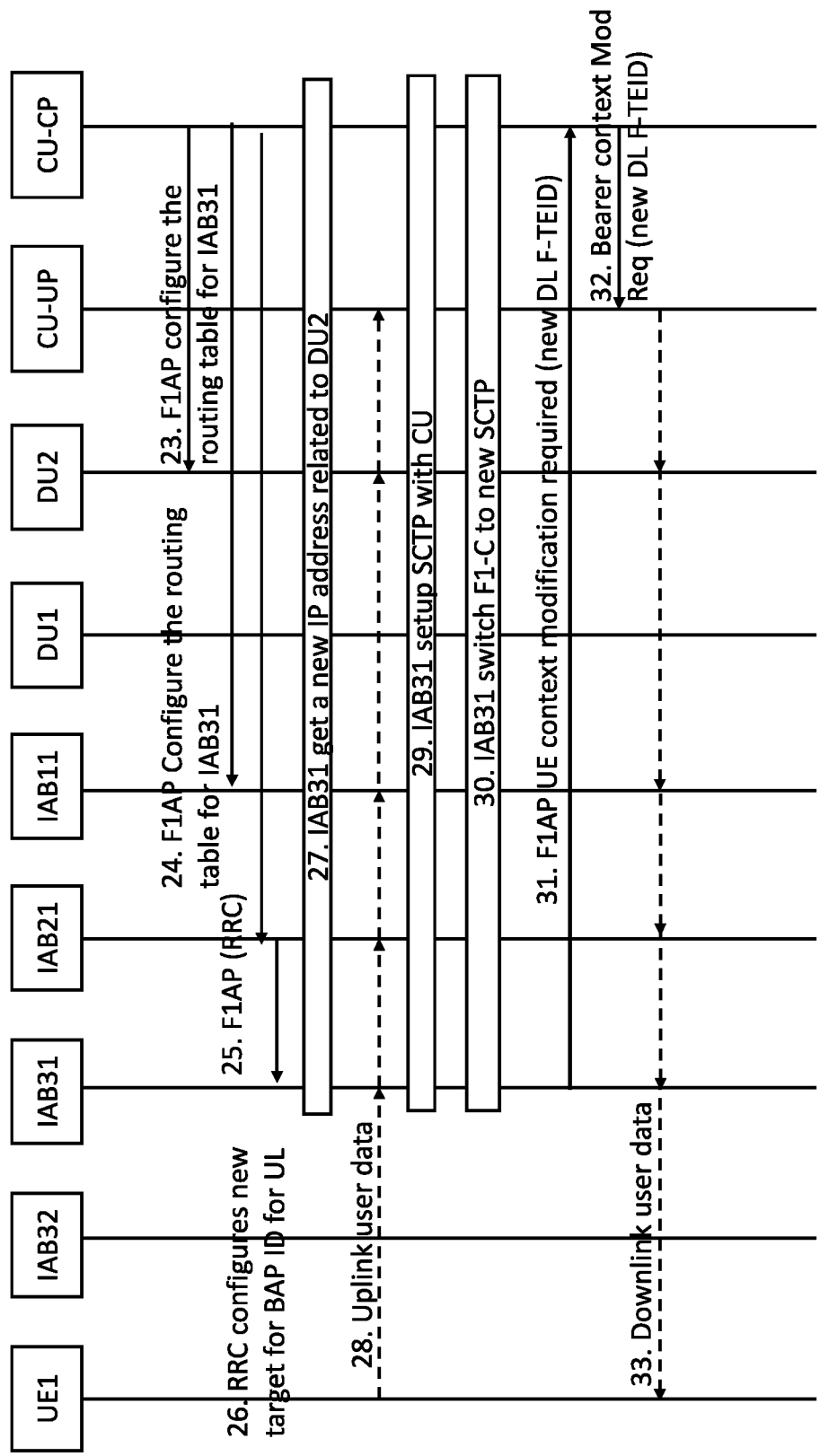

FIGS. 10, 11 and 12 show a schematic representation of a signalling diagram of a method of performing inter DU/intra CU topology adaptation/mobility. The signalling diagram may comprise some similarities with the signalling diagram of the method of performing inter DU/intra CU topology adaptation/mobility of 3GPP TS 38.401 (see FIG. 8.2.1.1-1). In this example, IAB11 is the migrating IAB node, and the migrating IAB node directly connect to donor DU. In another example, IAB31 is the migrating IAB node, and the migrating IAB node indirectly connect to donor DU via one or more intermediate IAB node(s). Hereafter, the migrating IAB node connect to the donor DU may mean the migrating IAB node directly connect to donor DU, or indirectly connect to donor DU via one or more intermediate IAB node(s).

Initially, UE1 may send uplink (UL) user data to CU-UP via IAB31, IAB21, IAB11 and DU1. Additionally or alternatively, UE1 may receive downlink (DL) user data from CU-UP via DU1, IAB11, IAB21 and IAB31.

In step 1, IAB11 may collect measurements and may send a MEASUREMENT REPORT message to DU1.

In step 2, DU1 may send an UL RRC TRANSFER message to the CU-CP to convey the received MEASUREMENT REPORT message In step 3, CU-CP determine to initiate the handover for IAB11-MT. CU-CP may send an UE CONTEXT SETUP REQUEST message to DU2 to create an UE context for IAB11 (i.e. IAB11-MT) and setup one or more data bearers. The UE CONTEXT SETUP REQUEST message may include handover preparation information.

In step 4, DU2 may respond to CU-CP with an UE CONTEXT SETUP RESPONSE message.

In step 5, CU-CP may send a UE CONTEXT MODIFICATION REQUEST message to DU1. The CONTEXT MODIFICATION REQUEST message may include a RRC RECONFIGURATION message.

In step 6, DU1 may send the RRC RECONFIGURATION message to IAB11.

In step 7, DU1 may respond to CU-CP with a UE CONTEXT MODIFICATION RESPONSE message.

In step 8, IAB11 may detach from old cell (i.e. cell of DU1) and synchronise to new cell (i.e. cell of DU2). IAB11 may stop the operation for the connected UEs and Child IABs. The Child IABs may also stop the operation for the connected UEs and further Child IABs. Alternatively, the IAB11 and Child IABs may only stop the UL data transmission, but continues the DL data transmission if the IAB11 and Child IABs still have buffered DL data not sent to the UEs. In this example, UE1 may stop sending UL user data to CU-UP via IAB31, IAB21, IAB11 and DU1. UE1 may receive DL user data via IAB11, IAB21 and IAB31 as long as IAB11, IAB21 and IAB31 have buffered DL user data. Then, UE1 may stop receiving DL user data via IAB11, IAB21 and IAB31.

In step 9, IAB11 may perform a random access procedure with DU2.

In step 10, IAB11 may send an RRCReconfigurationComplete message to DU2.

In step 11, DU2 may send an UL RRC MESSAGE TRANSFER message to CU-CP to convey the received RRCReconfigurationComplete message.

In step 12, CU-CP may initiate a F1AP procedure to configure a new adaptation-layer routing table in DU2 for routing DL user data and control data to IAB11. The F1AP message may contains a RRC message to IAB11.

In step 13, DU2 may transmit the RRC message to configure IAB11 with a new UL backhaul adaptation protocol identity (BAP ID). The new UL BAP ID may be used as a target BAP ID when IAB11 send UL control data or user data. The new UL BAP ID may be different from an existing UL BAP ID. The existing UL BAP ID may be a BAP ID of DU1. The new UL BAP ID may be a BAP ID of DU2.

Alternatively, the existing UL BAP ID may be a BAP ID of a CU connected to DU1. The new UL BAP ID may be a BAP ID of a CU connected to DU2. In the present case (i.e. intra-CU topology adaptation/mobility), IAB11 can continue to use the old BAP ID (i.e. the BAP ID of the CU) after intra-CU topology adaptation/mobility, thus CU-CP may not need to configure IAB11 with the new UL BAP ID.

In step 14, IAB11 may receive a new IP address assigned to IAB11 by DU2. The IP address may either be directly assigned by DU2, or assigned by another entity but anchored in DU2. The latter case may be for the scenario when the Donor-DU act as a proxy (e.g. dynamic host configuration protocol (DHCP) proxy) and the IP address is assigned by another entity (e.g. an external DHCP server). Alternatively, this step may be combined with step 13, for example, using one RRC message to configure IAB11 with the new UL BAP ID, and the new IP address. Additionally, the CU-CP may configure the routing table in DU2 for the mapping of IAB11's new IP address to the BAP ID of IAB11, which enable the DL routing to IAB11.

In step 15, IAB11 may use the new IP address assigned to IAB11 by DU2 to setup new SCTP association with CU-CP.

In step 16, IAB11 may initiate a DU configuration update procedure over the new SCTP association, and remove an existing SCTP association using the IP address assigned to IAB11 by DU1. With this step, IAB11 may switch F1-C to the new SCTP association using the IP address assigned to IAB11 by DU2.

In step 17, CU-CP may initiate a F1AP procedure to configure a new adaptation-layer routing table in DU2 for routing DL user data and control data to IAB21.

In step 18, CU-CP may initiate a F1AP procedure to configure a new adaptation-layer routing table in IAB11 for routing DL user data and control data to IAB21. The F1AP message may contain a RRC message to IAB21.

In step 19, the IAB11 send the RRC message to IAB21. The RRC message is used to configure IAB21 with the new UL BAP ID. The new UL BAP ID may be different from an existing UL BAP ID. The existing UL BAP ID may be a BAP ID of DU1. The new UL BAP ID may be a BAP ID of DU2.

In step 20, IAB21 may receive the new IP address assigned to IAB21 by DU2. The IP address may either be directly assigned by DU2, or assigned by another entity but anchored in DU2. The latter case may be for the scenario when the Donor-DU act as a proxy (e.g. DHCP proxy) and the IP address is assigned by another entity (e.g. an external DHCP server). Alternatively, this step may be combined with step 19, for example, using one RRC message to configure IAB21 with the new UL BAP ID, and the new IP address. Additionally, the CU-CP may configure the DU2 for the mapping of IAB21's new IP address to the BAP ID of IAB21, which enable the DL routing to IAB21.

In step 21, IAB21 may use the new IP address assigned to IAB21 by DU2 to setup new SCTP association with CU-CP.

In step 22, IAB21 may initiate a DU configuration update procedure over the new SCTP association and remove an existing SCTP association using the IP address assigned to IAB21 by DU1. With this step, IAB21 may switch F1-C to the new SCTP association using the IP address assigned to IAB21 by DU2.

In step 23, CU-CP may configure a new adaptation-layer routing table in DU2 for routing DL user data and control data to IAB31.

In step 24, CU-CP may configure a new adaptation-layer routing table in IAB11 for routing DL user data and control data to IAB31.

In step 25, CU-CP may initiate a F1AP procedure to configure a new adaptation-layer routing table in IAB21 for routing DL user data and control data to IAB31. The F1AP message may contain a RRC message to IAB31.

In step 26, the IAB21 send the RRC message to IAB31. The RRC message is used to configure IAB31 with the new UL BAP ID via IAB21. The new UL BAP ID may be different from an existing UL BAP ID. The existing UL BAP ID may be a BAP ID of DU1. The new UL BAP ID may be a BAP ID of DU2.

In step 27, IAB31 may receive a new IP address assigned to IAB31 by DU2. The IP address may either be directly assigned by DU2, or assigned by another entity but anchored in DU2. The latter case may be for the scenario when the Donor-DU act as a proxy (e.g. DHCP proxy) and the IP address is assigned by another entity (e.g. an external DHCP server). Alternatively, this step may be combined with step 26, for example, using one RRC message to configure IAB31 with the new UL BAP ID, and the new IP address. Additionally, the CU-CP may configure DU2 for the mapping of IAB31's new IP address to the BAP ID of IAB31, which enable the DL routing to IAB31.

In step 28, UE1 may resume sending UL user data to CU-UP via IAB31, IAB21, IAB11 and DU2.

In step 29, IAB31 may use the new IP address assigned to IAB31 by DU2 to setup new SCTP association with CU-CP.

In step 30, IAB31 may initiate a DU configuration update procedure over the new SCTP association and remove an existing SCTP association using the IP address assigned to IAB31 by DU1. With this step, IAB31 may switch F1-C to the new SCTP association using the IP address assigned to IAB31 by DU2.

In step 31, IAB31 may initiate a UE Context Modification procedure with CU-CP to modify the DL fully qualified tunnel endpoint identifier (F-TEID) for the F1-U tunnel between IAB31 with CU-UP. The F-TEID use the IAB31's new IP address. There may be one or more F1-U tunnels for UE1.

In step 32, CU-CP may initiate bearer context modification procedure to CU-UP to modify the DL F-TEID to use the new address allocated to IAB31 by DU2.

In step 33, the CU-UP may resume the DL transmission to UE1. UE1 may resume receiving DL user data from CU-UP via DU2, IAB11, IAB21 and IAB31.

In the above example, IAB 11 and child IAB nodes of IAB11 (e.g. IAB21 and IAB31) may implement two sets of DU/MT. IAB11 may use the second set of DU/MT to connect to DU2's cells. IAB11 may broadcast MIB/SIB for the second set of DU. The child IAB nodes of IAB11 (e.g. IAB21 and IAB31) may use the second set of MT to connect to the second set of DU of IAB11. At a specific time, the routing may be setup to both DU1 and DU2. This may have some disadvantages. It may impact the UE. The UE may need to be handover to the second set of DU of IAB31. Handover may need to be performed for every UE. Theoretically, the intra-CU topology adaptation has no impact to the UE.

Moreover, additional costs may be incurred for the IAB11 and child IAB nodes of IAB11 (e.g. IAB21 and IAB3) to implement two sets of DU/MT.

As illustrated above, the topology adaptation requires many steps to be performed when a migrating IAB node (e.g. IAB11) has multiple-hop child IAB nodes (e.g. IAB21 and IAB31). A UE (e.g. UE1) connected to a leaf IAB node (e.g. IAB31) may have to stop sending UL user data and/or receiving DL user data for a long period, since steps for the migrating IAB node and child IAB nodes are performed in sequence. This may cause a long interruption for an access UE, especially for those UEs connected to the leaf IAB nodes.

One or more of the following aspects allow to reduce the interruption time for access UE, especially for those UEs connected to the leaf IAB nodes.

One or more of the following aspects propose to configure a donor CU-CP to request a list of IP addresses for the migrating IAB node and child IAB nodes from a target donor-DU.

This may be performed during an UE context Setup procedure for IAB-MT (e.g. the HAP UE CONTEXT SETUP REQUEST message may include the list of identity of child IAB nodes and the PAP UE CONTEXT SETUP RESPONSE message may include the IP addresses assigned to the migrating IAB node and all child IAB nodes).

One or more of the following aspects propose to configure a donor CU-CP to request a target UL BAP ID and a list of IP addresses for the migrating IAB node and child IAB nodes from a target CU in case of inter-CU topology adaptation/mobility.

One or more of the following aspects propose to configure a donor CU-CP to configure at least the DL routing tables in a target donor DU or intermediate IAB nodes (e.g. using PAP signalling). The configured routing tables may be activated after the topology adaptation for a migrating IAB node is completed (e.g. upon the reception of a DL F1-C or F1-U packet or any other IP packets for the migrating IAB node or the child IAB nodes of the migrating IAB node, or upon the reception of a UL F1-C or F1-U packet or any other IP packets from the migrating IAB node or the child IAB nodes of the migrating IAB node, or after a HAP or RRC signalling is received from the donor CU).

One or more of the following aspects propose to configure a donor CU-CP to provide a new UL target BAP ID and new IP addresses to a migrating IAB node and child IAB nodes of the migrating IAB node. The new target BAP ID and new IP addresses may be included in a RRCReconfiguration message, or other RRC message, or a PAP message.

One or more of the following aspects propose to configure a donor CU-CP to initiate a change of IP address for DL data path or DL F1-U F-TEID(s), related to a specific IP address. The donor CU-CP may initiate the procedure once the migrating IAB node is connected to the target donor CU (e.g. once an RRCReconfigurationComplete is received from a migrating IAB node). The procedure may be performed per UE, or per migrating IAB node and child IAB node.

One or more of the following aspects propose to configure a donor CU-UP to receive a request from a donor CU-CP for a change of IP address for DL data path. The donor CU-UP may update all DL F-TEID(s) using an existing IP address to use a new IP address. Same DL GTP-TEID(s) may be used with the new IP address since there may be one-to-one mapping between the GTP-U entity using the existing IP address and the GTP-U entity using the new IP address.

One or more of the following aspects propose to configure a donor CU-UP to send DL packets using the new IP address.

One or more of the following aspects propose to configure a target donor DU to provide new IP addresses to CU-CP when requested and configure DL routing tables when requested.

One or more of the following aspects propose to configure a migrating IAB node to receive a new UL target BAP ID and a new IP address. The new UL target BAP ID may be related to a target donor DU or a target donor CU. The new IP address may be related to the target donor DU or the target donor CU.

One or more of the following aspects propose to configure a migrating IAB node to inform child IAB nodes of the migrating IAB node that a change from a source donor DU to a target donor DU is completed. This may be implemented via a RRC message (dedicated or broadcast) or an enhanced BAP header. This may include a new BAP ID, for example, the BAP ID of the target donor DU, or target donor CU.

One or more of the following aspects propose to configure a migrating IAB node to, upon connecting to a target donor DU, resume UL and DL data transmissions. For UL user data, the migrating IAB node may use a new UL target BAP ID, an existing destination IP address (e.g. donor CU IP address) or new destination IP address (e.g. target donor CU-UP IP address when donor-CU-UP is changed during topology adaptation), and new source IP address for UL F1-U and F1-C or any other IP packets.

The migrating IAB node may use the new source IP address to setup new SCTP association with the donor CU, and switch the F1AP to the new SCTP association.

One or more of the following aspects propose to configure child nodes of a migrating IAB node to receive a new UL target BAP ID and new IAB node IP addresses. The new UL target BAP ID may be related to a target donor DU or a target donor CU. The new IP addresses may be related to the target donor DU or the target donor CU.

One or more of the following aspects propose to configure child nodes of a migrating IAB node to, upon receiving a change of donor DU indication, resume UL and DL data transmissions. For UL, the child nodes of the migrating IAB node may use the new target BAP ID, existing destination IP address (e.g. donor CU IP address) or new destination IP address (e.g. target donor CU-UP IP address when donor-CU-UP is changed during topology adaptation), and new source IP addresses for UL F1-U and F1-C. The child nodes of a migrating IAB node may use the new source IP address to setup new SCTP association with the donor CU, and switch the F1AP to the new SCTP association.

Figure 13A:
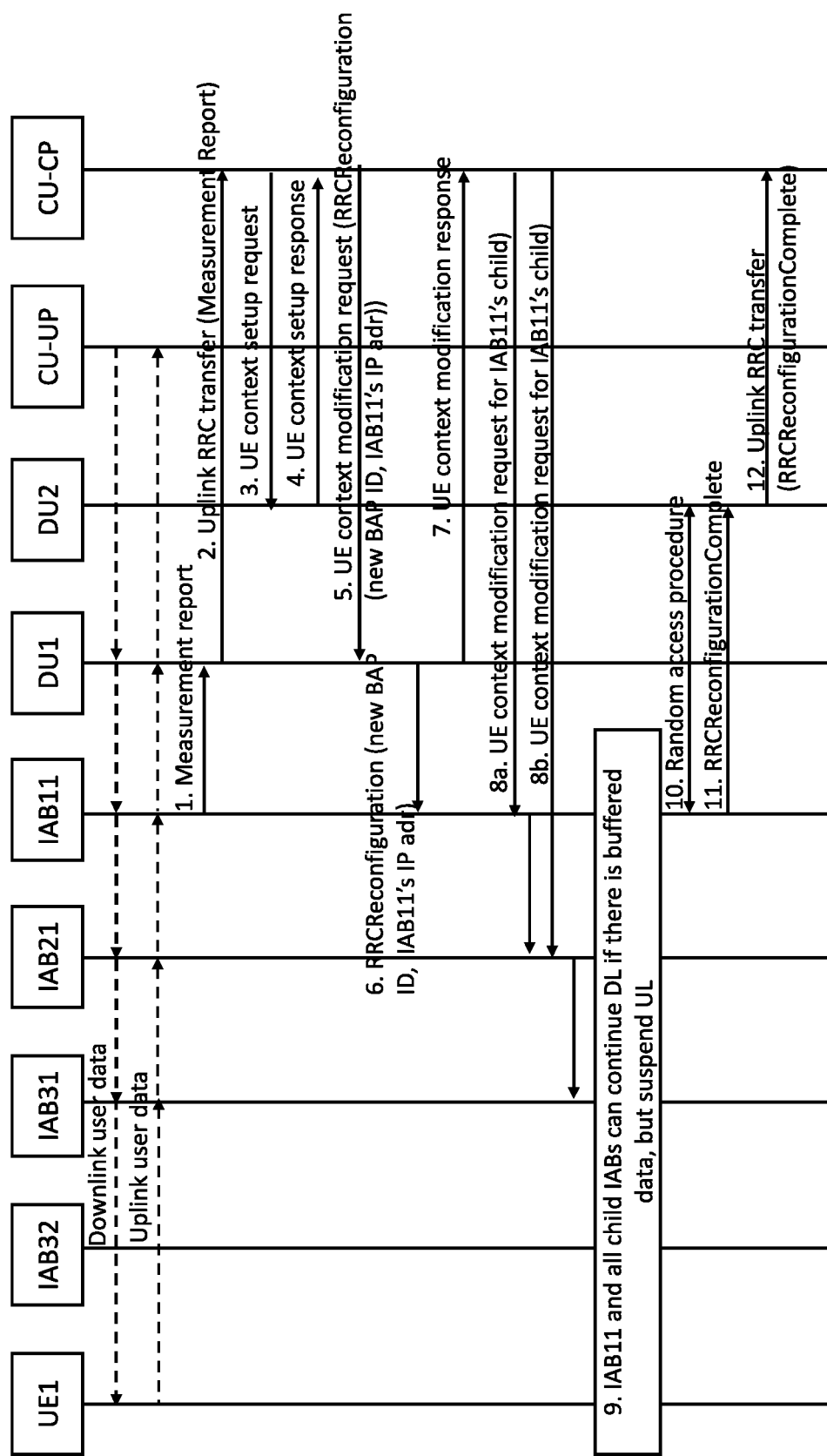
FIGS. 13*a* and 13*b* show a schematic representation of a signalling diagram of another method of performing topology adaptation/mobility.
Figure 13B:
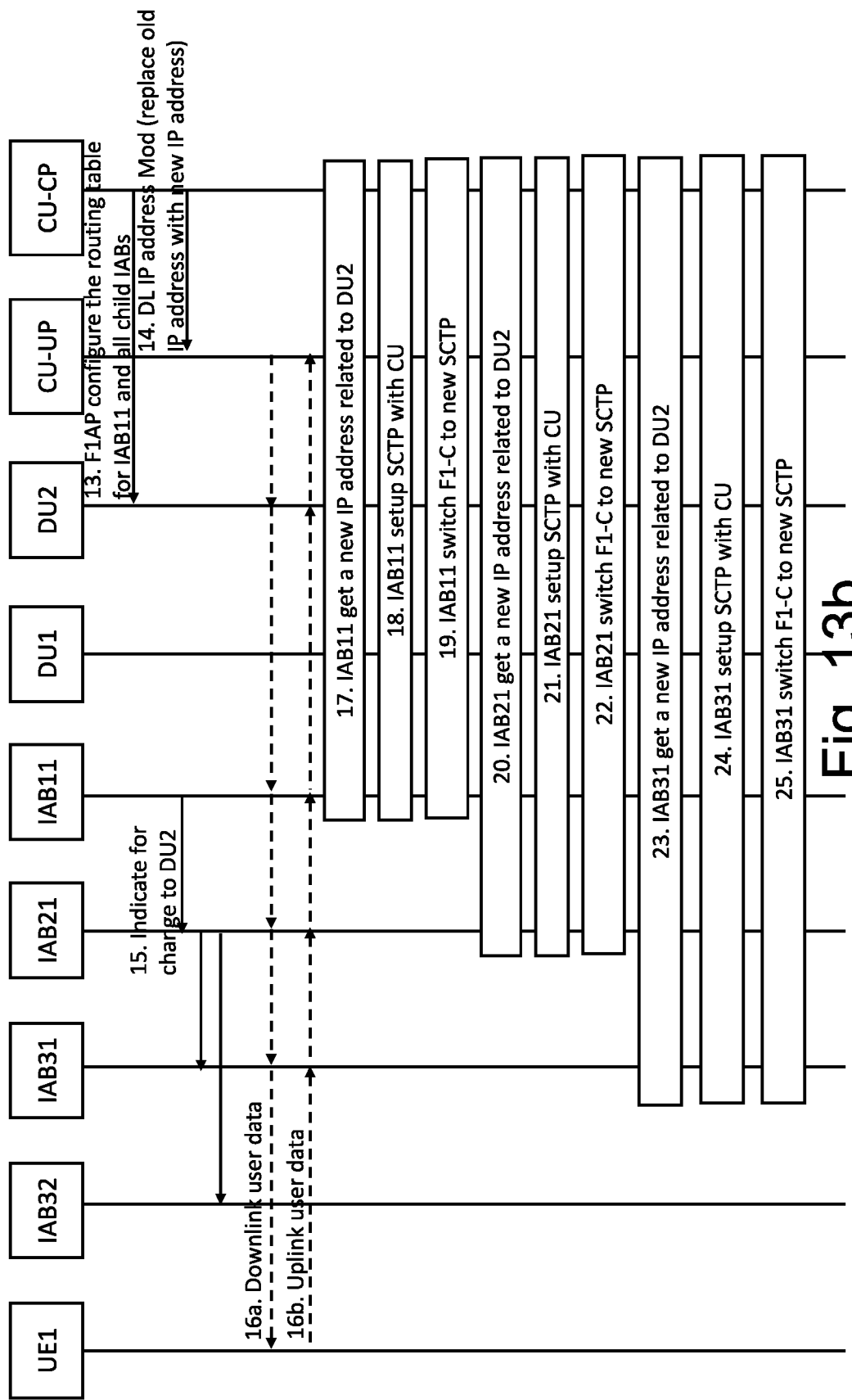

FIGS. 13a and 13b show a schematic representation of a signalling diagram of a method of performing inter DU/intra CU topology adaptation/mobility according to one or more aspects. In this example, IAB11 is the migrating IAB node, and the migrating IAB node directly connect to donor DU. In another example, IAB31 is the migrating IAB node, and the migrating IAB node indirectly connect to donor DU via one or more intermediate IAB node(s). Hereafter, the migrating IAB node connect to the donor DU may mean the migrating IAB node directly connect to donor DU, or indirectly connect to donor DU via one or more intermediate IAB node(s).

Initially, UE1 may send UL user data to CU-UP via IAB31, IAB21, IAB11 and DU1. Additionally or alternatively, UE1 may receive DL user data from CU-UP via DU1, IAB11, IAB21 and IAB31.

In step 1, IAB11 may collect measurements and may send a MEASUREMENT REPORT message to DU1.

In step 2, DU1 may send an UL RRC TRANSFER message to the CU-CP to convey the received MEASUREMENT REPORT message In step 3, CU-CP may determine to initiate the handover for IAB11-MT. CU-CP may send a F1AP message, for example, an UE CONTEXT SETUP REQUEST message, to DU2 to create an UE context for IAB11 (i.e. IAB11-MT) and setup one or more data bearers. The UE CONTEXT SETUP REQUEST message may include handover preparation information. The UE CONTEXT SETUP REQUEST message may include an indication of the context being setup for IAB node (i.e. IAB11) and a list of child IAB nodes of IAB11 (e.g. IAB21 and IAB31) for which DU2 is requested to create the context for the list of child IAB nodes of IAB11 and allocate new IP addresses. The context for the child IAB nodes may contain the identity of the child IAB node, and the IP address to the child IAB node.

When the migrating IAB node connect to target donor DU via one or more intermediate IAB node, the target DU for the migrating IAB node may be an IAB node. CU-CP determine the target donor DU, and perform step 3 with target donor DU.

During inter-CU topology adaptation, this step may be performed between target Donor CU-CP and target Donor DU. This step may be performed upon the reception of a HANDOVER REQUEST message from source Donor CU-CP (for Xn based handover), or from AMF (for NG based handover). The HANDOVER REQUEST message may include an indication of the context being setup for IAB node (i.e. IAB11) and a list of child IAB nodes of IAB11 (e.g. IAB21 and IAB31) for which target Donor DU is requested to allocate new IP addresses.

In step 4, DU2 may create the context for IAB11 and the list of child IAB nodes of IAB11, and allocate the IP address(es) for IAB11 and a list of child IAB nodes of IAB11. DU2 may respond to CU-CP with a F1AP message, for example, an UE CONTEXT SETUP RESPONSE message. The UE CONTEXT SETUP RESPONSE message may comprise the new IP address allocated to IAB11 by DU2. The IP address may either be directly allocated by DU2, or allocated by another entity but anchored in DU2. The later case may be for the scenario when the Donor-DU act as a proxy (e.g. DHCP proxy) and the IP address is allocated by another entity (e.g. an external DHCP server). The new IP address allocated to IAB11 by DU2 may be different from an existing IP address allocated to IAB11 by DU1. The UE CONTEXT SETUP RESPONSE message may also comprise new IP address(es) allocated by DU2 to the child IAB nodes of IAB11 (e.g. IAB21 and IAB31). The new IP address(es) allocated by DU2 to the child IAB nodes of IAB11 (e.g. IAB21 and IAB31) may be different from existing IP address(es) allocated to the child IAB nodes of IAB11 (e.g. IAB21 and IAB31) by DU1.

In case the CU-UP is changed during the intra-CU topology adaptation, before the CU-CP initiate the UE Context Setup procedure with DU2, the CU-CP may initiate the Bearer Context Setup procedure to setup the bearer context in the target CU-UP. The CU-UP may provide the bearer context, for example, new F1-U UL F-TEID(s), to the CU-CP. In addition, the CU-CP may initiate the same procedure to setup the bearer context in the target CU-UP for all UEs connected to IAB11 and child IAB nodes (e.g. IAB21 and IAB31).

During inter-CU topology adaptation, target Donor CU-CP may provide the new IP address(es) allocated to IAB11 and child IAB nodes by target Donor DU, to source Donor CU-CP, for example, via HANDOVER REQUEST ACKNOWLEDGE message.

Alternatively, step 3 and 4 may be performed by using other F1AP procedure, for example, a new F1AP message to request DU2 to allocate the IP address(es) for IAB11 and child IAB nodes, and a new F1AP message to provide the allocated IP address(es) to CU-CP.

In step 5, CU-CP may send a F1AP message, for example, an UE CONTEXT MODIFICATION REQUEST message, to DU1. The CONTEXT MODIFICATION REQUEST message may include a RRC message, for example, a RRC RECONFIGURATION message, for IAB11. The RRC RECONFIGURATION message may indicate to stop user data transmission for connected UE(s) and child IAB nodes of IAB11 (e.g. IAB21 and IAB31). The RRC RECONFIGURATION message may include a new UL BAP ID and the new IP address allocated to IAB11 by DU2. The new UL BAP ID may be different from an existing UL BAP ID. The existing UL BAP ID may be the BAP ID of DU1. The new UL BAP ID may be the BAP ID of DU2. The new UL BAP ID and the new IP address allocated to IAB11 by DU2 may be used by IAB11 after topology adaptation/mobility.

Alternatively, the existing UL BAP ID may be a BAP ID of a CU connected to DU1. The new UL BAP ID may be a BAP ID of a CU connected to DU2. In the present case (i.e. intra-CU topology adaptation/mobility), CU-CP may not need to configure IAB11 with the new UL BAP ID. In another case (i.e. inter-CU topology adaptation/mobility) CU-CP may know the target BAP ID (i.e. the BAP ID of target CU-CP) via configuration, or Xn setup procedure between source CU-CP and target CU-CP, or Xn or NG handover procedure. CU-CP may need to configure IAB11 with the new UL BAP ID.

In addition, if the CU-UP is changed during the topology adaptation, the new F1-U UL F-TEID(s) allocated by the new CU-UP may also be included in the RRC RECONFIGURATION message. Alternatively, the new F1-U UL F-TEID(s) as well as the new UL BAP ID and new IP address may be provided to IAB11 via other RRC message, or a F1AP message.

In step 6, DU1 may send the RRC message, for example, the RRC RECONFIGURATION message, to IAB11. The RRC RECONFIGURATION message may include the new UL BAP ID, the new IP address allocated to IAB11 by DU2, and the new F1-U UL F-TEID(s). IAB11 save the received new UL BAP ID, the new IP address allocated to IAB11 by DU2 and the new F1-U UL F-TEID(s), and may use them after the topology adaptation. In one example, after the topology adaptation, when IAB11 send any UL F1-C or F1-U packet or any other IP packet with destination set to UL BAP ID, IAB11 may use the new UL BAP ID (e.g. BAP ID of DU2), instead of the existing UL BAP ID (e.g. BAP ID of DU1). In another example, IAB11 may update its routing table with the new BAP ID after the topology adaptation. For example, for any routing entry using the existing UL BAP ID (e.g. BAP ID of DU1), IAB11 may replace the existing UL BAP ID (e.g. BAP ID of DU1) with the new BAP ID (e.g. BAP ID of DU2). This may ensure IAB11 can forward the UL F1-C or F1-U traffic or any other IP packet with destination set to the new UL BAP ID, received from child IABs, will be routed to DU2. This enables IAB11 to immediately resume the UL transmission after topology adaptation, without waiting for CU-CP to configure the routing table for the new UL BAP ID.

IAB11 may update the context for the connected UE(s) and child IAB nodes of IAB11 (e.g. IAB21 and IAB31). For example, after topology adaptation, for the IP packets carrying F1-C or F1-U packets or any other IP packets sent by IAB11, IAB11 may use the new IP address allocated to IAB11 by DU2, instead of the existing IP address allocated to IAB11 by DU1. In this way, IAB11 may immediately use the new UL BAP ID and the new IP address allocated to IAB11 by DU2, after topology adaptation. The existing IP address allocated to IAB11 by DU1 and the new IP address allocated to IAB11 by DU2 may be the source IP addresses for the IP packets, for example, carrying F1-C or F1-U packets, sent by IAB11.

In case the CU-UP is changed during the topology adaptation, the new F1-U UL F-TEID(s) may also be provided to IAB11 for the connected UE(s). This may be part of the RRC RECONFIGURATION message. Alternatively, the new F1-U UL F-TEID(s) may be provided by other RRC message, or a F1AP message to IAB11. IAB11 may save the received new F1-U UL F-TEID ID(s), and may use them after the topology adaptation.

In step 7, DU1 may respond to CU-CP with a F1AP message, for example, an UE CONTEXT MODIFICATION RESPONSE message.

In step 8a, CU-CP may initiate a F1AP message, for example, an UE Context Modification procedure, for IAB21.

More specifically, CU-CP may send a F1AP message, for example, an UE CONTEXT MODIFICATION REQUEST message, to IAB11. The UE CONTEXT MODIFICATION REQUEST may include a RRC message, for example, RRC RECONFIGURATION message, for IAB21. The RRC RECONFIGURATION message may indicate to stop user data transmission for connected UEs and child IAB nodes. The RRC RECONFIGURATION message may include the new UL BAP ID and the new IP address allocated to IAB21 by DU2. The new UL BAP ID may be different from an existing UL BAP ID. The existing UL BAP ID may be the BAP ID of DU1. The new UL BAP ID may be the BAP ID of DU2. The new UL BAP ID and the new IP address allocated to IAB21 by DU2 may be used by IAB21 after topology adaptation/mobility.

Alternatively, the existing UL BAP ID may be a BAP ID of a CU connected to DU1. The new UL BAP ID may be a BAP ID of a CU connected to DU2. In the present case (i.e. intra-CU topology adaptation/mobility), CU-CP may not need to configure IAB21 with the new UL BAP ID. In another case (i.e. inter-CU topology adaptation/mobility) CU-CP may need to configure IAB21 with the new UL BAP ID.

In addition, if the CU-UP is changed during the topology adaptation, the new F1-U UL F-TEID(s) allocated by the new CU-UP may also be included in the RRC message. Alternatively, the new F1-U UL F-TEID(s) may be provided to IAB21 via a F1AP message.

IAB11 may send the RRC message, for example, RRC RECONFIGURATION message, to IAB21. The RRC RECONFIGURATION message may include the new UL BAP ID, the new IP address allocated to IAB21 by DU2, and the new F1-U UL F-TEID(s) allocated by new CU-UP. IAB21 may save the received new UL BAP ID, the new IP address allocated to IAB21 by DU2 and the new F1-U UL F-TEID(s), and use them after the topology adaptation. In one example, after the topology adaptation, when IAB21 send any UL F1-C or F1-U packet or any other IP packet with destination set to UL BAP ID, IAB21 may use the new UL BAP ID (e.g. BAP ID of DU2), instead of the existing UL BAP ID (e.g. BAP ID of DU1). In another example, IAB21 may update its routing table with the new BAP ID after the topology adaptation. For example, for any routing entry using the existing UL BAP ID (e.g. BAP ID of DU1), IAB21 replace the existing UL BAP ID (e.g. BAP ID of DU1) with the new BAP ID (e.g. BAP ID of DU2). This may ensure IAB21 can forward the UL F1-C or F1-U traffic or any other IP packet with destination set to the new UL BAP ID, received from child IABs, will be routed to IAB11, then to DU2. This enables IAB21 to immediately resume the UL transmission after topology adaptation, without waiting for CU-CP to configure the routing table for the new UL BAP ID.

IAB21 may update the context for the connected UE(s) and child IAB(s). For example, after topology adaptation, for the IP packets carrying F1-C or F1-U packets or any other IP packet sent by IAB21, IAB21 use the new IP address allocated to IAB21 by DU2, instead of the existing IP address allocated to IAB21 by DU1. In this way, IAB21 can immediately use the new UL BAP ID and the new IP address allocated to IAB21 by DU2, after topology adaptation. The existing IP address allocated to IAB21 by DU1 and the new IP address allocated to IAB21 by DU2 may be the source IP addresses for the IP packets, for example, carrying F1-C or F1-U packets, sent by IAB21.

In case the CU-UP is changed due to the change of Donor-DU, the new F1-U UL F-TEID(s) may also be provided to IAB21 for the connected UE(s). This may be part of the RRC RECONFIGURATION message. Alternatively, the new F1-U UL F-TEID(s) as well as the new UL BAP ID and new IP address may be provided by other RRC message, or a F1AP message to IAB21. IAB21 may save the received new UL F-TEID ID(s), and use them after the topology adaptation.

In step 8b, CU-CP may initiate a F1AP message, for example, an UE Context Modification procedure for IAB31.

More specifically, CU-CP may send a F1AP message, for example, an UE CONTEXT MODIFICATION REQUEST message, to IAB21. The UE CONTEXT MODIFICATION REQUEST may include a RRC message, for example, RRC RECONFIGURATION message for IAB31. The RRC RECONFIGURATION message may indicate to stop user data transmission for connected UEs and child IAB nodes. The RRC RECONFIGURATION message may include the new UL BAP ID and the new IP address allocated to IAB31 by DU2. The new UL BAP ID may be different from an existing UL BAP ID. The existing UL BAP ID may be the BAP ID of DU1. The new UL BAP ID may be the BAP ID of DU2. The new UL BAP ID and the new IP address allocated to IAB21 by DU2 may be used by IAB21 after topology adaptation/mobility.

Alternatively, the existing UL BAP ID may be a BAP ID of a CU connected to DU1. The new UL BAP ID may be a BAP ID of a CU connected to DU2. In the present case (i.e. intra-CU topology adaptation/mobility), CU-CP may not need to configure IAB31 with the new UL BAP ID. In another case (i.e. inter-CU topology adaptation/mobility) CU-CP may need to configure IAB31 with the new UL BAP ID.

In addition, if the CU-UP is changed during the topology adaptation, the new F1-U UL F-TEID(s) allocated by the new CU-UP may also be included in the RRC message. Alternatively, the new F1-U UL F-TEID(s) may be provided to IAB31 via a F1AP message. In this example, the new F1-U UL F-TEID(s) for UE1 may be provided to IAB31 via a RRC message or a F1AP message.

IAB21 may send the RRC message, for example, RRC RECONFIGURATION message to IAB31. The RRC RECONFIGURATION message may include the new UL BAP ID, the new IP address allocated to IAB31 by DU2, and the new F1-U UL F-TEID(s) allocated by new CU-UP. IAB31 may save the received new UL BAP ID, the new IP address and the new F1-U UL F-TEID, and use them after the topology adaptation. In one example, after the topology adaptation, when IAB31 send any UL F1-C or F1-U packet or any other IP packet with destination set to UL BAP ID, IAB31 may use the new UL BAP ID (e.g. BAP ID of DU2), instead of the existing UL BAP ID (e.g. BAP ID of DU1). In another example, IAB31 may update its routing table with the new BAP ID after the topology adaptation. For example, for any routing entry using the existing UL BAP ID (e.g. BAP ID of DU1), IAB31 replace the existing UL BAP ID (e.g. BAP ID of DU1) with the new BAP ID (e.g. BAP ID of DU2). This may ensure IAB31 can forward the UL F1-C or F1-U traffic or any other IP packet with destination set to the new UL BAP ID, received from child IABs, will be routed to IAB11, then to DU2. This enables IAB31 to immediately resume the UL transmission after topology adaptation, without waiting for CU-CP to configure the routing table for the new UL BAP ID.

IAB31 may update the context for the connected UE(s) and child IAB(s). For example, after topology adaptation, for the IP packets carrying F1-C or F1-U packets or other IP packet sent by IAB31, IAB31 use the new IP address allocated to IAB31 by DU2, instead of the existing IP address allocated to IAB31 by DU1. In this way, IAB31 can immediately use the new UL BAP ID and the new IP address allocated to IAB31 by DU2, after topology adaptation. The existing IP address allocated to IAB31 by DU1 and the new IP address allocated to IAB31 by DU2 may be the source IP addresses for the IP packets, for example, carrying F1-C or F1-U packets, sent by IAB31.

In case the CU-UP is changed due to the change of Donor-DU, the new F1-U UL F-TEID(s) is also provided to IAB31 for the connected UE(s). This may be part of the RRC RECONFIGURATION message. Alternatively, the new F1-U UL F-TEID(s) as well as the new UL BAP ID and new IP address may be provided by other RRC message, or a F1AP message to IAB31. In this example, the new F1-U UL F-TEID(s) for UE1 may be provided to IAB31 via a RRC message or a F1AP message. IAB31 may save the received new UL F-TEID ID(s), and use them after the topology adaptation.

It will be understood that the UE Context Modification procedures, or other procedures for the child IAB nodes of IAB11 (e.g. IAB21 and IAB31) may be performed earlier (e.g. before step 6) in order to make sure that the UE Context Modification procedures or other procedures are completed before the IAB11 migrates to DU2. In any case, the UE Context Modification procedures, or other procedures should be completed before the IAB11-MT tune away from DU1.

In step 9, upon receiving the RRCReconfiguration message, IAB11 detach from old cell (i.e. cell of DU1) and synchronise to new cell (i.e. cell of DU2). IAB11 may stop operation for the connected UEs and child IAB nodes of IAB11 (e.g. IAB21 and IAB31), and tune to DU2. Alternatively, IAB11 may only stop the UL data transmission, but allow the transmission of DL user data to continue as long as IAB11 have buffered DL user data for the UEs and child IAB nodes of IAB11 (e.g. IAB21 and IAB31). The child IAB nodes of IAB11 (e.g. IAB21 and IAB31) may stop operation for the connected UEs and child IAB nodes. Alternatively, the child IAB nodes of IAB11 (e.g. IAB21 and IAB31) may suspend sending UL user data as soon as they have received the RRC signalling of steps 8a and 8b, or the parent node stop scheduling UL. The child IAB nodes of IAB11 (e.g. IAB21 and IAB31) may suspend sending UL user data by no longer request scheduling UL and/or by reconfiguring or revoking possibly existing semi-persistent or configured grants.

As a result, UE1 may stop sending UL user data to CU-UP via IAB31, IAB21, IAB11 and DU1. UE1 may still receive DL user data via IAB11, IAB21 and IAB31 as long as IAB11, IAB21 and IAB31 have buffered DL user data. Then, UE1 may stop receiving DL user data via IAB11, IAB21 and IAB31.

In step 10, IAB11 may perform a random access procedure with DU2.

In step 11, IAB11 may send an RRCReconfigurationComplete message to DU2.

IAB11 may start to use the new UL BAP ID, the new IP address allocated to IAB11 by DU2, and the new F1-U UL F-TEID(s) received in step 6. In one example, when IAB11 send an UL F1-C or F1-U packet or any other IP packets, IAB11 may use the new IP address as the source IP address. IAB11 may also use the new BAP ID as the destination ID, and the new routing table with routing entry related to the new BAP ID. In another example, IAB11 may use the new UL F-TEID(s) when sending UL F1-U packet. In another example, IAB11 may have a buffered UL F1-C or F1-U packet received from its child IAB node (e.g. IAB21), IAB11 may replace the BAP ID of the buffered UL F1-C or F1-U packet with the new BAP ID, then forward it to its parent node. The buffered UL F1-C or F1-U packet may happen when IAB11 received an UL F1-C or F1-U packet with destination set to the existing BAP ID from its child IAB node (e.g. IAB21) before step 9, but the packet cannot be sent to its parent node since IAB11 start to detach from old cell in step 9.

In step 12, DU2 may send an UL RRC MESSAGE TRANSFER message to CU-CP to convey the received RRCReconfigurationComplete message.

In step 13: CU-CP may initiate a F1AP procedure to configure a routing table in DU2 for DL traffic to IAB11 and the child IAB nodes of IAB11 (e.g. IAB21 and IAB31). For IAB11 and child IAB nodes of IAB11 (e.g. IAB21 and IAB31), configuring the DL routing table in DU2 may comprise creating a routing entry including at least the IP address allocated to the IAB by DU2 and the BAP ID of IAB. For DL IP traffic to IAB11 and child IAB nodes of IAB11 (e.g. IAB21 and IAB31), the DU2 can use the new routing table to create a BAP header including the BAP ID based on the destination IP address of the IP packet, then forward the BAP packet to the next hop IAB node.

In case there are other intermediate IAB nodes between DU2 and IAB11, CU-CP may also configure the routing tables in the intermediate IAB nodes. In this way, the DL traffic to IAB11 and the child IAB nodes of IAB11 (e.g. IAB21 and IAB31) may be routed to IAB11 and the child IAB nodes of IAB11 via DU2 and the intermediate IAB nodes.

In case of intra-CU topology adaptation/mobility, the existing BAP IDs of IAB11 and the child IAB nodes of IAB11 (e.g. IAB21 and IAB31) may remain unchanged. There may therefore be no need to configure DL routing tables in IAB11 and the child IAB nodes of IAB11 (e.g. IAB21 and IAB31) for DL traffic.

In one example, the topology adaptation may not change Donor-DU, and may only change the intermediate IAB node(s). The CU-CP may only need to configure the intermediate IAB node(s).

It will be understood that step 13 may be performed earlier (e.g. after step 4). If so, CU-CP may inform DU2 and intermediate IAB nodes that the configured routing tables in DU2 and intermediate IAB nodes may only be activated after the topology adaptation for IAB11 is completed. The activation may be implicit, e.g. upon the reception of a DL F1-C or F1-U packet for the migrating IAB node or the child IAB nodes of the migrating IAB node, or upon the reception of a UL F1-C or F1-U packet from the migrating IAB node or the child IAB nodes of the migrating IAB node, or may be explicit, e.g. CU-CP may initiate a F1AP procedure towards DU2 and intermediate IAB nodes to activate the updated routing tables.

After Step 13, the routing tables for DL traffic to IAB11 and the child IAB nodes of IAB11 (e.g. IAB21 and IAB31) are ready in DU2 and intermediate IAB nodes. The DL traffic could be the F1-C or F1-U packets or any other IP packets, or any other packets with destination is set to IAB11 or child IAB nodes.

In step 14: CU-CP may initiate an IP address modification procedure with CU-UP to change an IP address of the F1-U DL F-TEID(s) for UE(s) connected to IAB11 and child IABs. For example, CU-CP may initiate an IP address modification procedure with CU-UP to change the IP address of the F1-U DL F-TEID(s) for UE1 connected to IAB31 from the existing IP address allocated to IAB31 by DU1 to the new IP address allocated to IAB31 by DU2. As a result, the CU-UP may change the IP address of the F1-U DL F-TEID(s) for UE1 connected to IAB31 from the existing IP address allocated to IAB31 by DU1 to the new IP address allocated to IAB31 by DU2. This procedure may be repeated for all UEs connected to IAB11 and the child IAB nodes of IAB11 (e.g. IAB21 and IAB31). Alternatively, the CU-CP may initiate one procedure to change the IP address of the F1-U DL F-TEID(s) for all UEs connected to IAB31, from the existing IP address allocated to IAB31 by DU1 to the new IP address allocated to IAB31 by DU2. This procedure may be repeated for IAB11 and the child IAB nodes of IAB11 (e.g. IAB21 and IAB31).

After Step 14, the DL traffic for UE1 connected to IAB31 will be routed to DU2. The DL traffic for other UE connected to IAB11 and Child IAB nodes of IAB11 will be routed to DU2.

It will be understood that step 14 may be performed earlier (e.g. after step 4).

In step 15, IAB11 may informs the child nodes of IAB11 (e.g. IAB21 and IAB31) that the migration to DU2 is completed. This may be performed, for example, by sending a NULL DL data packet with a BAP header indicating the change to new UL BAP ID of DU2, or other identity of DU2. Upon the reception of this indication, the child nodes of IAB11 (e.g. IAB21 and IAB31) may start use the new UL BAP ID, the new IP address allocated to the child nodes of IAB11 (e.g. IAB21, IAB31, IAB32) by DU2, and the new F1-U UL F-TEID(s). In one example, when the child IAB node send an UL F1-C or F1-U packet or any other IP packets, the child IAB node may use the new IP address as the source IP address. The child IAB node may also use the new BAP ID as the destination ID, and the new routing table with routing entry related to the new BAP ID. In another example, the child IAB node may use the new UL F-TEID(s) when send UL F1-U packets. In another example, the child IAB node (e.g. IAB21) may have a buffered UL F1-C or F1-U packet received from its child IAB node (e.g. IAB31), the child IAB node may replace the BAP ID of the buffered UL F1-C or F1-U packet with the new BAP ID, then forward it to its parent node. The buffered UL F1-C or F1-U packet may happen when the IAB node (e.g. IAB21) received an UL F1-C or F1-U packet with destination set to the existing BAP ID from its child IAB node (e.g. IAB31) before step 9, but the packet cannot be sent to its parent node (e.g. IAB11) since its parent node (e.g. IAB11) stopped UL in step 9.

It will be understood that step 15 may be performed just after IAB11 connects to DU2 (step 11).

It will also be understood that step 14 and step 15 may be performed simultaneously (i.e. in parallel) or sequentially (i.e. one after another).

In step 16, the IAB11 and child IABs can resume the UL and DL transmission. UE1 may resume receiving DL user data from CU-UP via DU2, IAB11, IAB21 and IAB31. UE1 may resume transmitting UL user data to CU-UP via IAB31, IAB21, IAB11, and DU2. Since IAB11 and the child nodes of IAB11 (e.g. IAB21 and IAB31) have new IP addresses allocated by DU2 they may setup new GTP-U entity and copy the UE contexts to the new GTP-U entity. The new GTP-U entity may use the same F1-U DL TEID(s) as the existing GTP-U entity and thus there may be no need to signal the new F1-U DL TEID(s). For UL, in case it is intra-CU topology adaptation without the change of CU-UP, IAB11 and the child nodes of IAB11 (e.g. IAB21 and IAB31) may continue to use the same F1-U UL F-TEID(s), but the source address for the F1-U IP packet may be changed to the new IP address received in step 6 for IAB11, or step 8*a* and 8*b* for child IAB nodes. In case it is the intra-CU topology adaptation with the change of CU-UP, the target F1-U UL F-TEID(s) is the one assigned by the target CU-UP, which is received in step 6 for IAB11, or step 8a and 8b for child IAB nodes.

In step 17, IAB11 may receive the new IP address allocated to IAB11 by DU2. The IP address is either directly assigned by DU2, or assigned by another entity but anchored in DU2. The latter case is for the scenario when the Donor-DU act as a proxy (e.g. DHCP proxy) and the IP address is assigned by another entity (e.g. an external DHCP server). Step 17 may be performed when IAB11 get the new IP address via DHCP. In case RRC is used to assign an IP address, IAB11 may get the new IP address in Step 6.

In step 18, IAB11 may use the new IP address to setup new SCTP association with CU-CP.

In step 19, IAB11 may initiate a DU configuration update procedure over the new SCTP association using the IP address assigned by DU2, and remove the existing SCTP association using the IP address assigned by DU1. The F1-C is now switched to the new SCTP association.

In step 20, IAB21 may receive the new IP address allocated to IAB21 related to DU2. In case RRC is used to assign an IP address, IAB21 may get the new IP address in Step 8a.

In step 21, IAB21 may use the new IP address to setup new SCTP association with CU-CP.

In step 22, IAB21 may initiate a DU configuration update procedure over the new SCTP association using the IP address assigned by DU2, and remove the existing SCTP association using the IP address assigned by DU1. The F1-C is now switched to the new SCTP association.

In step 23, IAB31 may receive the new IP address allocated to IAB31 related to DU2. Step 23 may be performed when IAB31 get the new IP address via DHCP. In case RRC is used to assign an IP address, IAB31 may get the new IP address in Step 8b.

In step 24, IAB31 may use the new IP address to setup new SCTP association with CU-CP.

In step 25, IAB31 may initiate a DU configuration update procedure over the new SCTP association using the IP address assigned by DU2, and remove the existing SCTP association using the IP address assigned by DU1. The F1-C is now switched to the new SCTP association.

In this way, UE1 may resume the sending UL user data and receiving DL user data as soon as the topology adaptation for IAB11 is completed. This reduces the interruption time during the migration from DU1 to DU2.

Figure 14:
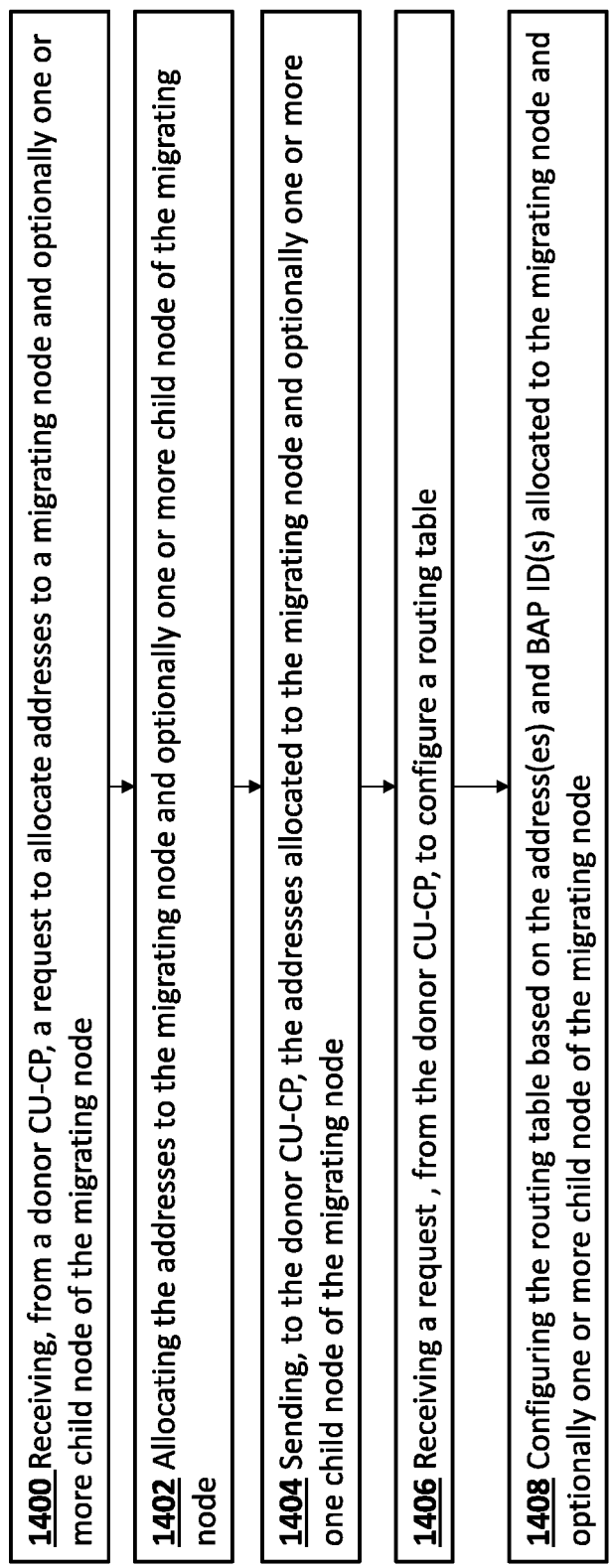
FIG. 14 shows a schematic representation of a block diagram of a method of performing topology adaptation implemented, for example, by a target integrated access and backhaul donor distributed unit.

FIG. 14 shows a schematic representation of a block diagram of a method of performing topology adaptation implemented, for example, by a target donor DU (e.g. DU2). All these steps may be performed before topology adaptation for the migrating node (e.g. IAB11) is completed. For example, before the migrating node connects to target donor DU (e.g. DU2) either directly, or indirectly when there is intermediate IAB node between target donor DU and the migrating node.

In step 1400, the target donor DU (e.g. DU2) may receive, from a donor CU-CP, a request to allocate IP address(es) to a migrating node (e.g. IAB11) and optionally one or more child node (e.g. IAB21 and IAB31) of the migrating node (e.g. IAB11). This step may be performed before the migrating node (e.g. IAB11) connects to target donor DU (e.g. DU2). Step 1400 may be mapped to step 3 of FIG. 13a.

In step 1402, the target donor DU (e.g. DU2) may allocate the IP address(es) to the migrating node (e.g. IAB11) and optionally one or more child node (e.g. IAB21 and IAB31) of the migrating node (e.g. IAB11). This step may be performed before the migrating node (e.g. IAB11) connects to target donor DU (e.g. DU2). Step 1402 may also be mapped to step 4 of FIG. 13a or it may happen between steps 3 and 4.

In step 1404, the target donor DU (e.g. DU2) may send, to the donor CU-CP, the IP address(es) allocated to the migrating node (e.g. IAB11) and optionally one or more child node (e.g. IAB21 and IAB31) of the migrating node (e.g. IAB11). This step may be performed before the migrating node (e.g. IAB11) connects to target donor DU (e.g. DU2). Step 1404 may be mapped to step 4 of FIG. 13a.

In step 1406, the target donor DU (e.g. DU2) may receive a request, from the donor CU-CP, to configure a routing table for the migrating node (e.g. IAB11) and optionally one or more child node (e.g. IAB21 and IAB31) of the migrating node (e.g. IAB11). The request may include at least the IP address(es) and BAP ID(s) for the migrating node (e.g. IAB11) or optionally one or more child node (e.g. IAB21 and IAB31) of the migrating node (e.g. IAB11). This step may be performed before or after the migrating node (e.g. IAB11) connects to target donor DU (e.g. DU2). When step 1406 is performed before the migrating node (e.g. IAB11) connects to target donor DU (e.g. DU2), the request may indicate that the configured routing table may only be activated after the topology adaptation is completed. Step 1406 may be mapped to step 13 of FIG. 13b.

In step 1408, the target donor DU (e.g. DU2) may configure the routing table with at least the IP address(es) and BAP ID(s) allocated to the migrating node (e.g. IAB11) or optionally one or more child node (e.g. IAB21 and IAB31) of the migrating node (e.g. IAB11). This step may be performed before or after the migrating node (e.g. IAB11) connects to target donor DU (e.g. DU2). When step 1408 is performed before the migrating node (e.g. IAB11) connects to target donor DU (e.g. DU2), the configured routing table may only be activated after the topology adaptation is completed. After the topology adaptation is completed, the target donor DU (e.g. DU2) may receive an indication that the configured routing table can be activated. Step 1408 may also be mapped to step 13 of FIG. 13b.

Figure 15:
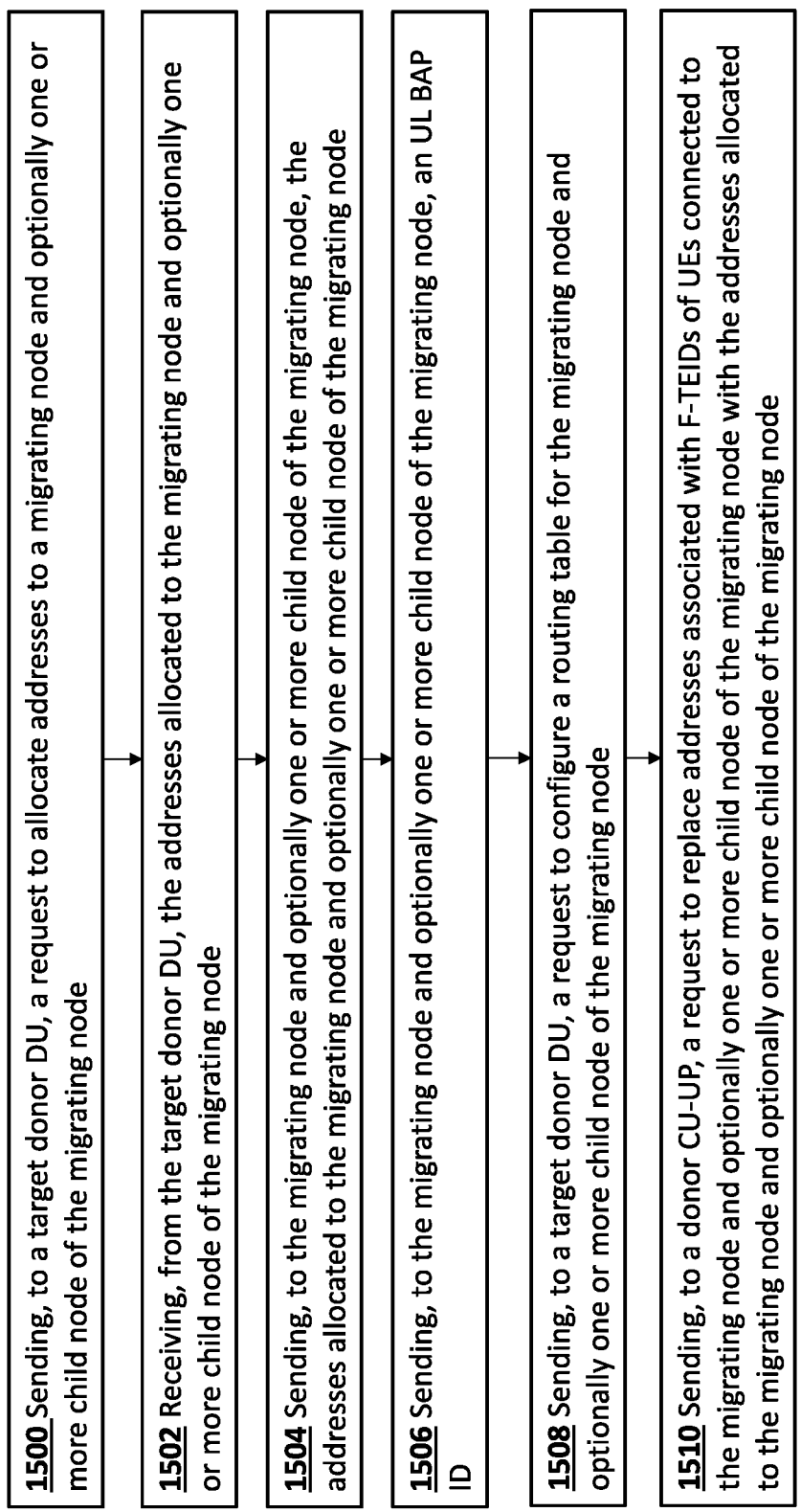
FIG. 15 shows a schematic representation of a block diagram of a method of performing topology adaptation implemented, for example, by an integrated access and backhaul donor centralized unit control plane.

FIG. 15 shows a schematic representation of a block diagram of a method of performing topology adaptation implemented, for example, by a donor CU-CP.

In step 1500, the donor CU-CP may send, to a target donor DU (e.g. DU2), a request to allocate IP address(es) to a migrating node (e.g. IAB11) and optionally one or more child node (e.g. IAB21 and IAB31) of the migrating node (e.g. IAB11). Step 1500 may be mapped to step 3 of FIG. 13a.

In step 1502, the donor CU-CP may receive, from the target donor DU (e.g. DU2), the IP address(es) allocated to the migrating node (e.g. IAB11) and optionally one or more child node (e.g. IAB21 and IAB31) of the migrating node (e.g. IAB11). Step 1502 may also be mapped to step 4 of FIG. 13a.

In step 1504, the donor CU-CP may send, to the migrating node (e.g. IAB11) and optionally one or more child node (e.g. IAB21 and IAB31) of the migrating node (e.g. IAB11), the IP address(es) allocated to the migrating node (e.g. IAB11) and optionally one or more child node (e.g. IAB21 and IAB31) of the migrating node (e.g. IAB11).

Step 1504 may be mapped to steps 5, 6, 8a and 8b of FIG. 13a.

In step 1506, the donor CU-CP may send, to the migrating node (e.g. IAB11) and optionally one or more child node (e.g. IAB21 and IAB31) of the migrating node (e.g. IAB11), at least one of an UL BAP ID and a F1-U UL F-TEID. Step 1506 may also be mapped to steps 6, 8a and 8b of FIG. 13a.

In step 1508, the donor CU-CP may send, to a target donor DU (e.g. DU2) and intermediate IAB nodes, a request to configure a routing table for the migrating node (e.g. IAB11) and optionally one or more child node (e.g. IAB21 and IAB31) of the migrating node (e.g. IAB11). Step 1508 may be mapped to step 13 of FIG. 13*b*.

In step 1510, the donor CU-CP may send, to a donor CU-UP, a request to replace IP address(es) associated with F1-U DL F-TEIDs of UEs connected to the migrating node (e.g. IAB11) and optionally one or more child node (e.g. IAB21 and IAB31) of the migrating node (e.g. IAB11) with the new IP address(es) allocated to the migrating node (e.g. IAB11) and optionally one or more child node (e.g. IAB21 and IAB31) of the migrating node (e.g. IAB11). Step 1510 may be mapped to step 14 of FIG. 13*b*.

Figure 16:
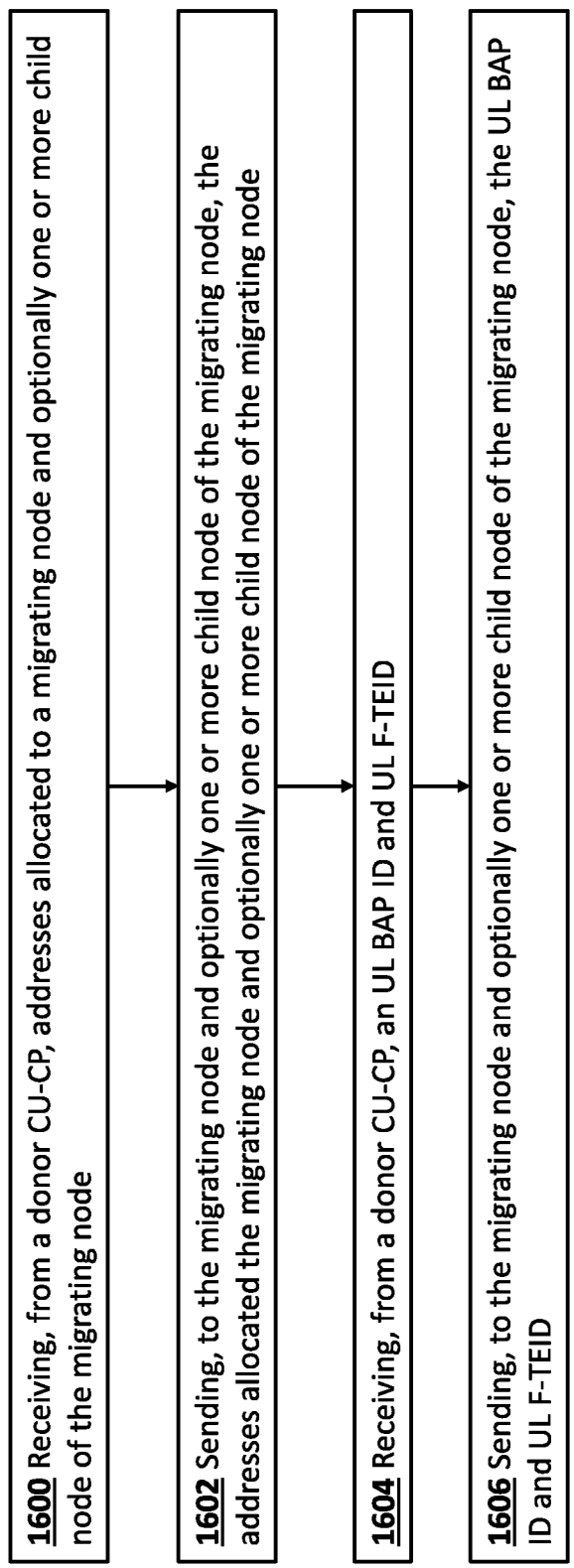
FIG. 16 shows a schematic representation of a block diagram of a method of performing topology adaptation implemented, for example, by a source integrated access and backhaul donor distributed unit.

FIG. 16 shows a schematic representation of a block diagram of a method of performing topology adaptation implemented, for example, by a source donor DU (e.g. DU1).

In step 1600, the source donor DU (e.g. DU1) may receive, from a donor CU-CP, IP address(es) allocated to a migrating node (e.g. IAB11) and optionally one or more child node (e.g. IAB21 and IAB31) of the migrating node (e.g. IAB11). Step 1600 may be mapped to step 5 of FIG. 13*a*.

In step 1602, the source donor DU (e.g. DU1) may send, to the migrating node (e.g. IAB11) and optionally one or more child node (e.g. IAB21 and IAB31) of the migrating node (e.g. IAB11), the IP address(es) allocated to the migrating node (e.g. IAB11) and optionally one or more child node (e.g. IAB21 and IAB31) of the migrating node (e.g. IAB11). Step 1602 may be mapped to steps 6, 8*a* and 8*b* of FIG. 13*a*.

In step 1604, the source donor DU (e.g. DU1) may receive, from the donor CU-CP, at least one of an UL BAP ID and a UL F-TEID. Step 1604 may be also be mapped to step 5 of FIG. 13*a*.

In step 1606, the source donor DU (e.g. DU1) may send, to the migrating node (e.g. IAB11) and optionally one or more child node (e.g. IAB21 and IAB31) of the migrating node (e.g. IAB11), at least the UL BAP ID or the UL F-TEID. Step 1606 may be also be mapped to steps 6, 8*a* and 8*b* of FIG. 13*a*.

Although not illustrated with a block diagram, method of performing topology adaptation implemented, for example, by an IAB node may comprise the following steps. The IAB node may be a migrating node (e.g. IAB11) or a child node of the migrating node (e.g. IAB21 and IAB31), or an intermediate IAB node.

The IAB node may receive and save a new IP address allocated by a target CU-DU (e.g. DU2), a new UL BAP ID, and an UL F-TEID and save them. This step may be mapped to step 6, 8*a*, 8*b* of FIG. 13*a*.

The IAB node may receive the request to configure the routing table, before the migrating IAB node connects to target DU. The request may indicate the configured routing table may be activated after topology adaptation. This step may be mapped to step 13 of FIG. 13*b*.

The IAB node may receive an indication that the topology adaptation is completed. This step may be mapped to step 15 of FIG. 13*b*.

After topology adaptation is completed, the IAB node may use the configured routing table to forward the UL packets to target donor DU, and forward the DL packets to migrating IAB node and child IAB nodes of the migrating IAB node. The IAB node may also use the target CU-DU (e.g. DU2), a new UL BAP ID, a new IP address, and an UL F-TEID. For example, the IAB node may update and use an UL routing table with the new BAP ID. The IAB node may use the new BAP ID as the destination when sending an UL F1-C or F1-U packet or any other IP packets. The IAB node may use the new IP address as source address when sending UL F1-C or F1-U packet or any other IP packets. The IAB node may use the UL F-TEID to send the UL F1-U packet. This step may be mapped to step 16*a* and 16*b* of FIG. 13*b*.

Likewise, a method of performing topology adaptation implemented, for example, by CU-UP may comprise the following steps.

The CU-UP may allocate a new UL F-TEID for topology adaptation with CU-UP change. The CU-UP may update a F1-U DL path to use a DL F-TEID using a new IP address allocated by a target CU-DU. This step may be mapped to step 14 of FIG. 13*b*.

FIG. 17 shows a schematic representation of non-volatile memory media 1700*a* (e.g. computer disc (CD) or digital versatile disc (DVD) and 1700*b* (e.g. universal serial bus (USB) memory stick) storing instructions and/or parameters 1702 which when executed by a processor allow the processor to perform one or more of the steps of the above methods.

It is noted that while the above describes example embodiments, there are several variations and modifications which may be made to the disclosed solution without departing from the scope of the present invention.

The embodiments may thus vary within the scope of the attached claims. In general, some embodiments may be implemented in hardware or special purpose circuits, software, logic or any combination thereof. For example, some aspects may be implemented in hardware, while other aspects may be implemented in firmware or software which may be executed by a controller, microprocessor or other computing device, although embodiments are not limited thereto. While various embodiments may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments may be implemented by computer software stored in a memory and executable by at least one data processor of the involved entities or by hardware, or by a combination of software and hardware. Further in this regard it should be noted that any of the above procedures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (ASIC), gate level circuits and processors based on multi-core processor architecture, as non-limiting examples.

Alternatively or additionally some embodiments may be implemented using circuitry. The circuitry may be configured to perform one or more of the functions and/or method steps previously described. That circuitry may be provided in the base station and/or in the communications device.

As used in this application, the term "circuitry" may refer to one or more or all of the following:
(a) hardware-only circuit implementations (such as implementations in only analogue and/or digital circuitry);
(b) combinations of hardware circuits and software, such as:
  (i) a combination of analogue and/or digital hardware circuit(s) with software/firmware and
  (ii) any portions of hardware processor(s) with software (including digital signal processor(s)), software, and memory(ies) that work together to cause an apparatus, such as the communications device or base station to perform the various functions previously described; and
(c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example integrated device.

The foregoing description has provided by way of exemplary and non-limiting examples a full and informative description of some embodiments However, various modifications and adaptations may become apparent to those skilled in the relevant arts in view of the foregoing description, when read in conjunction with the accompanying drawings and the appended claims. However, all such and similar modifications of the teachings will still fall within the scope as defined in the appended claims.

What is claimed is:

1. An apparatus comprising:
at least one processor; and
at least one memory including computer program code;
the at least one memory and the computer program code configured to, with the at least one processor, cause the apparatus at least to:
receive a request to create context for a migrating node;
allocate addresses to the migrating node;
send the addresses allocated to the migrating node, prior to the migrating node migrating from a source to a target;
receive, from a donor centralized unit control plane, a request to configure a routing table for downlink traffic to the migrating node;
map the addresses allocated to the migrating node with a downlink backhaul adaptation protocol identifier of the migrating node; and
activate the configured routing table subsequent to the migrating node migrating from the source to the target.

2. The apparatus of claim 1, wherein the source is a source donor distributed unit or an integrated access and backhaul node connected via a source donor distributed unit.

3. The apparatus of claim 1, wherein the target is a target donor distributed unit or an integrated access and backhaul node connected via a target donor distributed unit.

4. The apparatus of claim 1, the at least one memory and the computer program code are configured to, with the at least one processor, cause the apparatus at least to receive, from a donor centralized unit control plane, the request to create context for the migrating node.

5. The apparatus of claim 1, wherein the at least one memory and the computer program code are configured to, with the at least one processor, cause the apparatus at least to:
send, to a donor centralized unit control plane, the addresses allocated to the migrating node.

6. The apparatus of claim 1, wherein the at least one memory and the computer program code are configured to, with the at least one processor, cause the apparatus at least to:
receive, from a donor centralized unit control plane, a request to configure the routing table for downlink traffic to the migrating node and at least one child node of the migrating node; and
configure the routing table based on the addresses allocated to the migrating node and the at least one child node of the migrating node.

7. The apparatus of claim 6, wherein configuring the routing table for downlink traffic to the migrating node and the at least one child node of the migrating node based on the addresses to the migrating node and the at least one child node of the migrating node comprises mapping the addresses allocated to the migrating node and the at least one child node of the migrating node with respective downlink backhaul adaptation protocol identifiers of the migrating node and backhaul adaptation protocol identifiers of the at least one child node of the migrating node.

8. The apparatus of claim 1, wherein the apparatus is a target donor distributed unit.

9. A method comprising:
receiving a request to create context for a migrating node;
allocating addresses to the migrating node;
sending the addresses allocated to the migrating node, prior to the migrating node migrating from a source to a target;
receiving, from a donor centralized unit control plane, a request to configure a routing table for downlink traffic to the migrating node;
mapping the addresses allocated to the migrating node with a downlink backhaul adaptation protocol identifier of the migrating node; and
activating the configured routing table subsequent to the migrating node migrating from the source to the target.

10. The method of claim 9, wherein the source is a source donor distributed unit or an integrated access and backhaul node connected via a source donor distributed unit.

11. The method of claim 9, wherein the target is a target donor distributed unit or an integrated access and backhaul node connected via a target donor distributed unit.

12. The method of claim 9, wherein the request to create context for the migrating node is received from a donor centralized unit control plane.

13. The method of claim 9, further comprising sending, to a donor centralized unit control plane, the addresses allocated to the migrating node.

14. The method of claim 9, further comprising:
receiving, from a donor centralized unit control plane, a request to configure the routing table for downlink traffic to the migrating node and at least one child node of the migrating node; and configuring the routing table based on the addresses allocated to the migrating node and the at least one child node of the migrating node.

15. The method of claim 14, wherein configuring the routing table for downlink traffic to the migrating node and the at least one child node of the migrating node based on the addresses to the migrating node and the at least one child node of the migrating node comprises mapping the addresses allocated to the migrating node and at least one child node of the migrating node with respective downlink backhaul adaptation protocol identifiers of the migrating node and backhaul adaptation protocol identifiers of the at least one child node of the migrating node.

16. The method of claim 9, wherein the method is performed by a target donor distributed unit.

17. At least one memory including computer program code configured to, with at least one processor, cause an apparatus at least to:
receive a request to create context for a migrating node;
allocate addresses to the migrating node;
send the addresses allocated to the migrating node, prior to the migrating node migrating from a source to a target;
receive, from a donor centralized unit control plane, a request to configure a routing table for downlink traffic to the migrating node;
map the addresses allocated to the migrating node with a downlink backhaul adaptation protocol identifier of the migrating node; and
activate the configured routing table subsequent to the migrating node migrating from the source to the target.

18. The at least one memory of claim 17, wherein the source is a source donor distributed unit or an integrated access and backhaul node connected via a source donor distributed unit.

19. The at least one memory of claim 17, wherein the target is a target donor distributed unit or an integrated access and backhaul node connected via a target donor distributed unit.

20. The at least one memory of claim 17, wherein the request to create context for the migrating node is received from a donor centralized unit control plane.

* * * * *

UNITED STATES PATENT AND TRADEMARK OFFICE
CERTIFICATE OF CORRECTION

PATENT NO. : 11,611,501 B2
APPLICATION NO. : 15/733510
DATED : March 21, 2023
INVENTOR(S) : Xu et al.

Page 1 of 1

It is certified that error appears in the above-identified patent and that said Letters Patent is hereby corrected as shown below:

In the Claims

In Column 36, Line 1, Claim 4, after "claim 1," insert --wherein--.

Signed and Sealed this
Twenty-ninth Day of April, 2025

Coke Morgan Stewart
*Acting Director of the United States Patent and Trademark Office*